United States Patent
Moss et al.

(10) Patent No.: US 7,238,230 B1
(45) Date of Patent: Jul. 3, 2007

(54) ASPHALT-BASED COATING COMPOSITIONS AND SALT SURFACTANTS

(75) Inventors: David Kelly Moss, Charlotte, NC (US); James A. Krogh, Janesville, WI (US)

(73) Assignee: Tomah Products, Inc., Milton, WI (US)

( * ) Notice: Subject to any disclaimer, the term of this patent is extended or adjusted under 35 U.S.C. 154(b) by 42 days.

(21) Appl. No.: 11/336,023

(22) Filed: Jan. 20, 2006

(51) Int. Cl.
*C09D 195/00* (2006.01)
*C08L 95/00* (2006.01)
*B01F 17/46* (2006.01)
*C07C 211/64* (2006.01)

(52) U.S. Cl. .............................. 106/284.02; 106/284.4; 516/203; 516/916; 564/294

(58) Field of Classification Search ............ 106/284.02, 106/284.4; 516/203, 916; 564/294
See application file for complete search history.

(56) References Cited

U.S. PATENT DOCUMENTS

| | | | |
|---|---|---|---|
| 2,704,280 A | 3/1955 | Trowbridge, II | |
| 3,347,690 A | 10/1967 | Galvin et al. | |
| 3,352,916 A * | 11/1967 | Zech | 564/504 |
| 4,725,358 A | 2/1988 | Ananthapadmanabhan et al. | |
| 4,759,799 A | 7/1988 | Vicenzi | |
| 5,362,314 A | 11/1994 | Vicenzi et al. | |
| 5,362,690 A | 11/1994 | Delvaux et al. | |
| 5,391,325 A | 2/1995 | Swenson et al. | |
| 5,529,621 A | 6/1996 | Hudson et al. | |
| 5,618,340 A | 4/1997 | Krogh et al. | |
| 5,622,554 A | 4/1997 | Krogh et al. | |
| 5,693,133 A | 12/1997 | Largent et al. | |
| 5,730,791 A | 3/1998 | Krogh et al. | |
| 6,169,064 B1 | 1/2001 | Krogh et al. | |
| 6,471,764 B1 * | 10/2002 | Robertson et al. | 106/493 |

OTHER PUBLICATIONS

Product brochure from Akzo Chemie describing Redicote CG roof coating composition (Jan. 1994.).
Christian, Robert V. Jr. And Hixon, R.M., "The Hydrolysis of Some β-Alkoxypropionitriles", *Journal of American Chemical Society*, 70 (Apr. 1948), 1333.
MacGregor, J.H. and Pugh, C., "The Reaction of Acrylonitrile with Aliphatic Alcohols", *Journal of American Chemical Society*, (Apr. 1945), 535.
Knepper, W.A., United States Steel Corporation, "Iron", *Kirk-Othmer Concise Encyclopedia of Chemical Technology*, New York: John Wiley & Sons, Inc. (1985), no month avail.
Aplan, Frank F., The Pennsylvania State University, "Flotation", *Kirk-Othmer Concise Encylopedia of Chemical Technology*, New York: John Wiley & Sons, Inc. (1985), no month avail.
Oberteuffer, John and Wechsler, Ionel, Sala Magnetics, Inc., "Magnetic Separation", *Kirk-Othmer Concise Encyclopedia of Chemical Technology*, New York: John Wiley & Sons, Inc. (1985), no month avail.
Product brochure from Chemax, Inc. describing MAXCOTE RC 2015 additive for roof coating composition (Jan. 1992).
Gerhardt et al., Synthesis and Analysis of Ether Carboxylic Acids, Tenside Surfactants Detergents, vol. 3, pp. 169-174 (1992), no month avail.
Product brochure from Surface Chemists of Florida, Inc. describing SURTECH AS-109 additive for asphalt compositions, no date.

* cited by examiner

*Primary Examiner*—David M. Brunsman
(74) *Attorney, Agent, or Firm*—Jansson, Shupe, Munger & Antaramian, Ltd.

(57) ABSTRACT

Asphalt-based coating compositions and surfactants. The asphalt-based coating compositions have improved performance and comprise asphalt, clay, and a propoxylated alcohol-based ether amine salt surfactant.

48 Claims, 6 Drawing Sheets

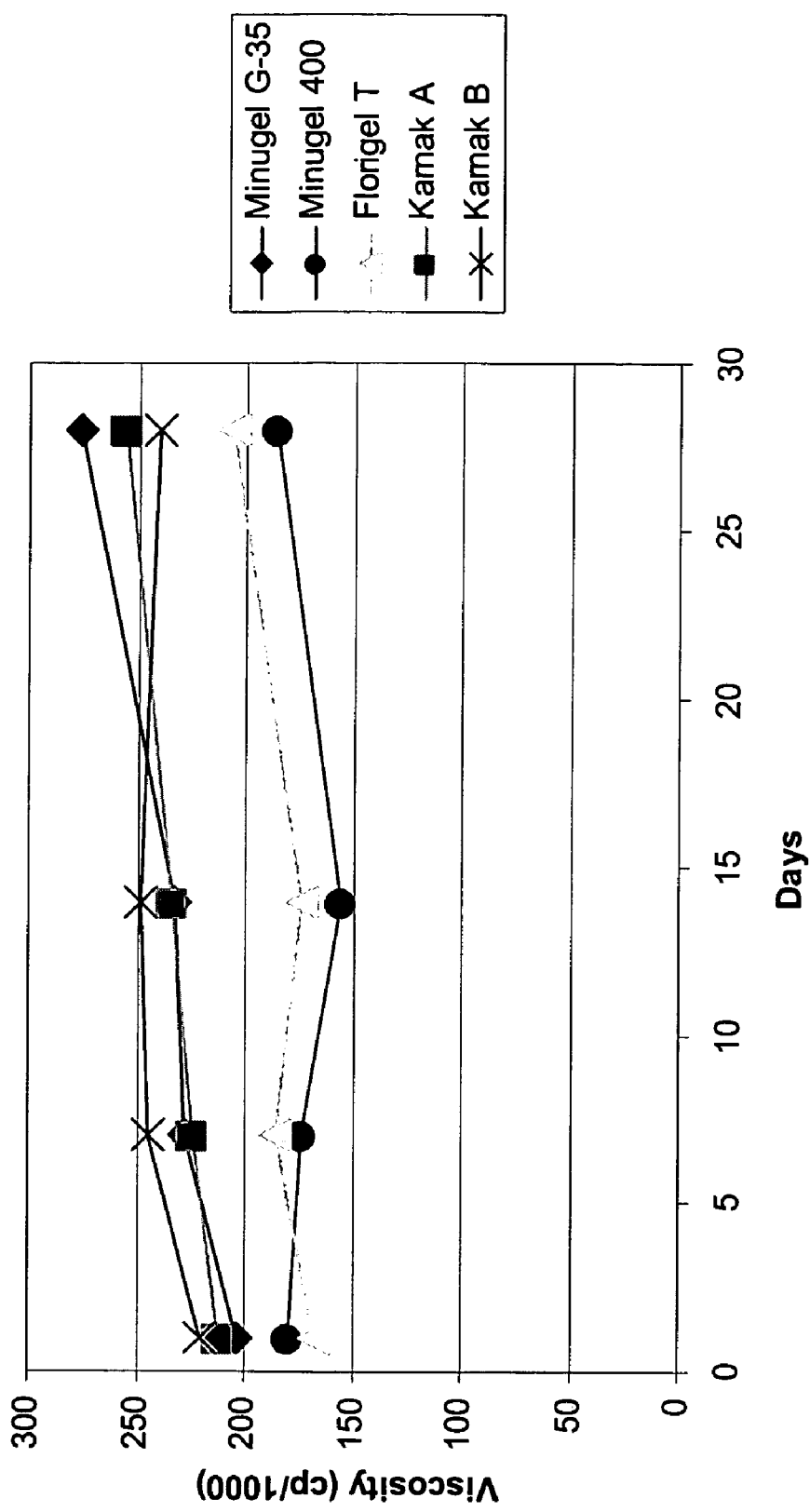

ASPHALT-BASED COATING COMPOSITIONS AND SALT SURFACTANTS

FIELD

The field is coatings and, more specifically, asphalt-based coating compositions including salt surfactants.

BACKGROUND

Asphalt-based coating compositions are used in a broad range of applications wherein it is desired to construct, coat, patch, join, fill and repair a diverse range of articles and things. Exemplary applications for asphalt-based coating compositions include use in roof construction and repair, pavement construction and repair and use as a durable, protective coating for application to buildings, surfaces and mechanical and electrical apparatus.

Asphalt-based coating compositions are supplied to both the industrial and consumer markets. Coating compositions for use in these separate markets are typically formulated using different base constituents. Consumer-market coating compositions typically comprise an admixture of asphalt cutback, clay and surfactant as base constituents. The asphalt cutback constituent is provided as a binder. The clay constituent thickens the composition and provides gelling properties. The surfactant constituent is provided to wet and disperse the clay and asphalt cutback constituents by reducing interfacial tension.

Industrial-market coating compositions commonly utilize a base formulation comprising either an admixture of asphalt cutback, clay and surfactant or a formulation comprising asphalt cutback and asbestos. Such asbestos-containing compositions can include as much as fifty weight percent of asbestos. The asbestos imparts bulk to the coating composition and provides excellent adhesion within the asphalt constituents.

There are, however, disadvantages associated with the use of asbestos. Asbestos must be handled carefully due to potential toxicity problems associated with the handling and disposal of this material. Environmental and compliance costs associated with asbestos can be prohibitively high. Asbestos is banned in some communities and is not used in the consumer coating marketplace thereby requiring a formulator to make different coating compositions for different geographic regions and markets resulting in increased costs.

The coatings industry is extremely cost competitive. There is an ongoing effort to develop asphalt-based coating compositions which provide improved performance yet cost less. As those of skill in the art are aware, small price differences per unit volume of coating can have a significant effect on product sales and can mean the difference between success or failure in the marketplace.

One way to control cost is to formulate asphalt-based coating compositions which are free of asbestos. However, if asbestos is not used then the surfactant must be capable of dispersing and wetting the coating constituents thereby imparting the desired viscosity to the compositions. The surfactant cost is typically high relative to the cost of the other coating constituents.

Another way to control cost is to reduce the amount of surfactant required. The amount of surfactant utilized is commonly expressed in terms of the ratio of clay to surfactant (the "C/S ratio"). The C/S ratio is the ratio of the weight percentage of clay to the weight percentage of surfactant in the overall composition. The C/S ratio is a useful measure of surfactant content because asphalt cutback is the predominant constituent of the coating formulations and the amount of asphalt cutback typically does not vary greatly with respect to the amount of clay and surfactant utilized. The higher the C/S ratio the lower the amount of surfactant composition used and the lower the cost of the resultant coating.

Asbestos-free asphalt-based roof coating compositions typically have a C/S ratio in the range of about 7:1 to about 10:1. A surfactant capable of producing the same or similar results to known coating compositions at a higher C/S ratio would potentially present an opportunity to control costs.

Asphalt-based coating compositions should also be easy to manufacture and formulate in order to further control cost. By way of example, older asbestos-free roof coating compositions were based on quaternary ammonium chloride salt surfactants (particularly dialkyl quaternary ammonium chlorides) and these surfactants were difficult to use thereby imposing costs on the formulator. Quaternary ammonium chloride salts were difficult to use because they are typically in a solid or paste-like form at room temperature thereby making it difficult to admix the surfactant with the other coating constituents and to obtain a homogenous mixture. In order to utilize these types of surfactants, they must first be liquified, either by admixture with solvents or by heating the surfactants. The use of solvents is disadvantageous because of cost and because the end product comprises less than 100% active surfactant. Heating the surfactant adds a further processing step and presents the potential for the decomposition and deactivation of the surfactant. And, heating the surfactant raises potential fire hazard concerns, particularly if flammable solvents are present in the surfactant.

Quaternary ammonium chloride salts were also found to be corrosive making them difficult to package and store. Such corrosivity limited the use of the asphalt-based coating compositions with corrosion-prone metals, such as automobile underbodies.

Costs can be further controlled and coating quality improved by providing a surfactant which is robust and capable of imparting appropriate viscosity to asphalt-based compositions including a wide range of asphalts, clays and other constituents. Asphalts used to make asphalt cutbacks, lack uniformity and vary greatly in constituents. As is well known in the coating manufacturing industry, asphalts may be oxidized or unoxidized, depending upon the grade desired and the practice of the asphalt manufacturer. Oxidization of the asphalt can greatly affect its characteristics. Other asphalt cutback constituents can vary significantly. Seemingly similar coating material constituents can vary widely in material properties depending on the geographic region from which such materials are refined, mined or otherwise obtained. Inability of the surfactant to wet and disperse a wide range of constituents will result in loss of viscosity and cause premature failure of the composition. Conversely, a surfactant having efficacy with a broad range of coating constituents would provide an improved product while reducing costs to the formulator.

There has been considerable interest in asphalt-based coating compositions and surfactants for wetting and dispersing coating composition constituents in the patent literature. Examples include U.S. Pat. No. 4,759,799 (Vicenzi), U.S. Pat. No. 5,618,340 (Krogh et al.), U.S. Pat. No. 5,622,554 (Krogh et al.), U.S. Pat. No. 5,730,791 (Krogh et al.), U.S. Pat. No. 6,169,064 (Krogh et al.), U.S. Pat. No. 5,693,133 (Largent et al.), U.S. Pat. No. 5,529,621 (Hudson et al.) and U.S. Pat. No. 5,662,733 (Hudson et al.).

And, a number of asphalt-based coating compositions are commercially available. Representative compositions include No. 100 Elastomulsion® and No. 107 Asphalt Emulsion available from the Henry Company of Huntington Park, Calif., Redicote® brand emulsions available from Akzo Nobel Chemicals, Inc. of Willowbrook, Ill. and No. 71AF Fibered Asphalt Coating, No. 229AR Elastomeric, No. 100AF Non-Fibered Emulsion Coating, No. 107 Velvet Roof Coating and No. 112AF Foundation & Roof Coatings available from Karnak Corporation of Clark, N.J.

The industry standard surfactant used with many commercially-available asphalt-based coating compositions is PA-14 Acetate™ surfactant available from Tomah Products, Inc. of Milton, Wis. PA-14 Acetate is an isodecyloxypropyl amine acetate salt surfactant.

There is nonetheless, an ongoing need for cost-effective asphalt-based coating compositions with improved viscosity and gel stability, which are easy to manufacture and apply, which are free of any requirement for asbestos, which are robust and capable of being used with a wide variety of coating constituents and which avoid the disadvantages of prior art coating compositions. And, there is an ongoing need for improved surfactants capable of use in such compositions.

SUMMARY

The invention comprises asphalt-based coating compositions and surfactants for use therein. Exemplary coating compositions may be adapted for use in a broad range of applications including for use in coating, patching, joining, filling, repairing and sealing surfaces of, for example, roofs and roof membranes, flashing, buildings, machines, and pavement. Exemplary asphalt-based coating compositions may be formulated across a wide range of viscosities to yield, for example, highly viscous roof coating compositions as well as flowable spray-applied coatings.

In general, asphalt-based coating compositions comprise about 50 to about 98 weight percent asphalt cutback, about 43 to about 1.7 weight percent clay and a propoxylated alcohol-based ether amine salt surfactant having the general structural formula I:

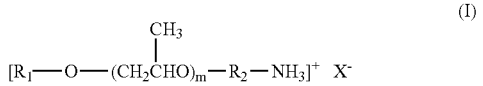

(I)

wherein, $R_1$ is a linear, branched or cyclic, saturated or unsaturated aliphatic or alkylaryl group having between about 8 to about 24 carbon atoms, m is an integer from 1 to about 4, $R_2$ is an n-propyl or iso-propyl group and X— is an anion. The salt surfactant is present in sufficient amount to impart a desired viscosity to the composition.

The anion X— is preferably the negatively charged ion of an organic or inorganic acid used to prepare the propoxylated alcohol-based ether amine salt. Preferably, the acid is present in sufficient amount to neutralize the amine. However, the acid may be present in amounts excess of the amount required to neutralize the amine, for example about 1.5 to about 2.5 molar equivalents of acid per mole of amine.

The surfactant constituent is preferably provided in an amount of about 0.1 to about 7 weight percent of the asphalt-based coating compositions. For roof coating compositions, the surfactant is provided in an amount sufficient to impart a stable gel structure or gel stability to the asphalt-based coating compositions.

Asphalt-based coating compositions may be formulated across a wide range of clay to surfactant ratios (C/S ratio). For roof coating compositions, the preferred C/S ratio range is about 6:1 to 18:1. Compositions as described herein may be formulated at the upper end of this C/S ratio range because of surfactant efficacy.

Additives may be included to impart desired properties to the coating compositions. Fillers and solvents are examples.

Asphalt-based coating compositions as described herein can be formulated to have excellent viscosities and, for roof coating compositions and the like, a stable gel structure. These results can be achieved with an amount of surfactant less than that previously required, thereby potentially providing the same or improved performance at a reduced cost. Manufacture of asphalt-based coating compositions such as those described herein is facilitated by the excellent liquidity properties of the surfactants. Asphalt-based coating compositions as described herein may be made free of asbestos.

BRIEF DESCRIPTION OF THE DRAWINGS

FIG. 6 is a graph showing the viscosities of exemplary asphalt-based roof coating compositions including a neutralized Neodol 25 alcohol-based 25-P1-PA Ac (Neodol 25-P1-PA Ac) ether amine acetate salt at a C/S ratio of 8:1. Data are provided for compositions including five representative clay constituents.

DETAILED DESCRIPTION OF PREFERRED EMBODIMENTS

Figure 1:
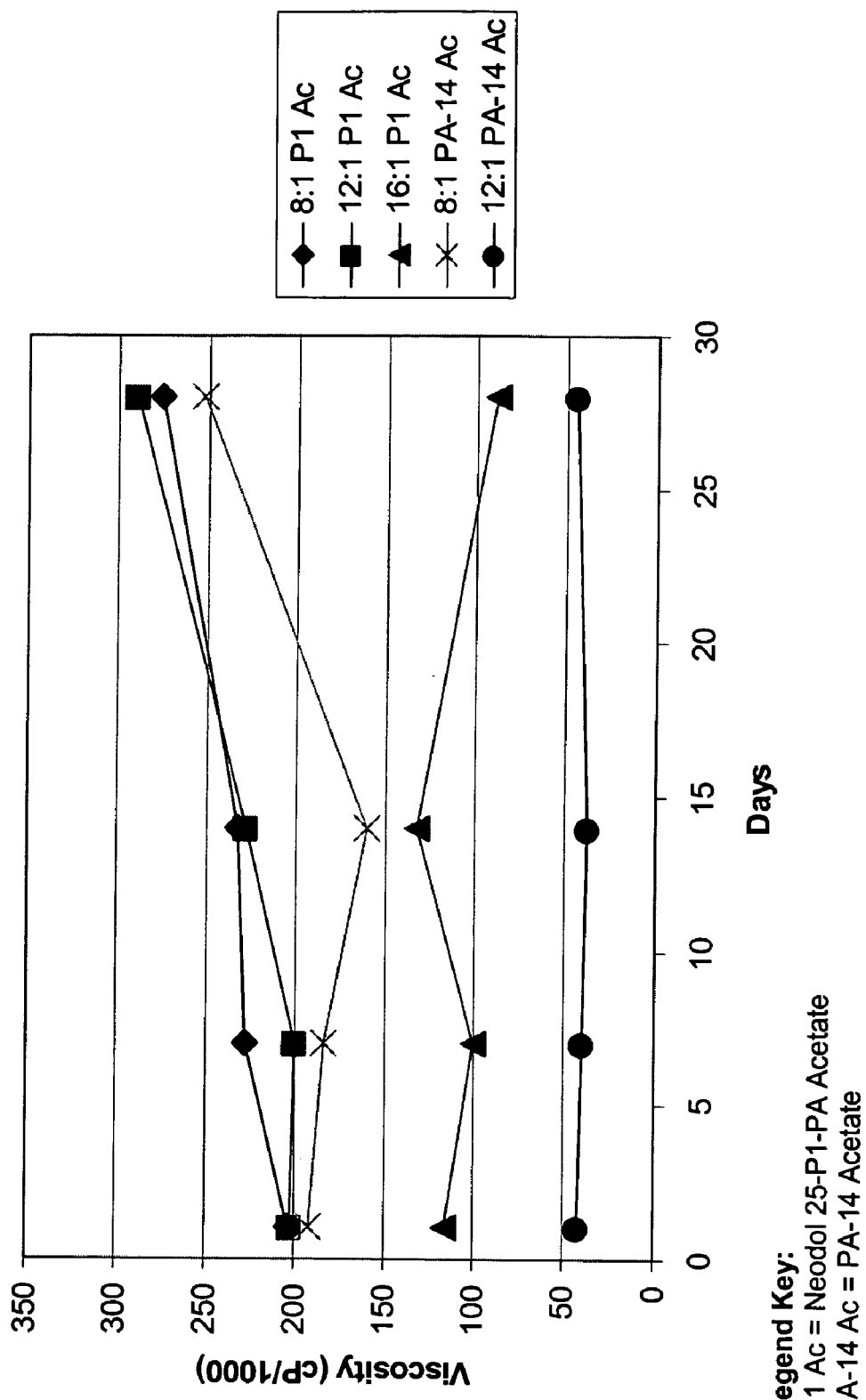
FIG. 1 is a graph showing the viscosities of exemplary asphalt-based roof coating compositions including a surfactant consisting of a neutralized propoxylated (one molar equivalent) $C_{12}$–$C_{15}$ alcohol-based ether amine acetate salt (Neodol® 25 alcohol-based 25-P1-PA Ac also referred to as Neodol 25-P1-PA Ac) at C/S ratios of 8:1, 12:1 and 16:1. Exemplary asphalt-based coating compositions including the industry standard decyloxypropylamine acetate salt surfactant (Tomah Products PA-14 Acetate also referred to as PA-14Ac) at C/S ratios of 8:1 and 12:1 are included for comparison.

Asphalt-based coating compositions according to the invention comprise three base constituents: an asphalt cutback constituent, a clay constituent and a surfactant constituent. The surfactant constituent comprises one or more propoxylated alcohol-based ether amine salts. The base constituents, and any optional constituents, are admixed to yield the coating compositions. Propoxylated alcohol-based ether amine salt surfactants are robust in that they are capable of being used with many different asphalts, clays and other constituents to produce excellent coating compositions.

Definitions

"About" means approximately or nearly and in the context of a numerical value or range set forth herein means±10% of the numerical value or range recited or claimed.

"Alcohol" refers to a straight or branched aliphatic hydrocarbon or alkylaryl hydrocarbon substituted by at least one hydroxy group.

"Aliphatic" refers to carbon atoms linked in chains.

"Aryl" means substituted or unsubstituted aromatic carbocyclic radicals and substituted and unsubstituted heterocyclics having from 5 to about 14 ring atoms.

"Alkylaryl" means a substituted aryl group attached to the parent moiety through an oxygen atom.

"Asphalt" means or refers to the product of the nondestructive distillation of crude oil in petroleum refining; it is a dark brown to black, cement-like semisolid or solid. Depending on the crude oil used as a feed-stock, the distillation residue may be further processed, typically by air-blowing (sometimes with a catalyst) or solvent precipitation to meet performance specifications for individual applications. Asphalt is typically a mixture of paraffinic and aromatic hydrocarbons and heterocyclic compounds containing sulfur, nitrogen, and oxygen.

"Asphalt-based" means or refers to a composition which includes asphalt as a constituent.

"Asphalt cutback" means or refers to an asphalt that has been liquified by blending with petroleum solvents (diluents). Upon exposure to atmospheric conditions the diluents evaporate, leaving the asphalt to perform its function.

The term "clay" means or refers to a soft earth material, which is plastic, or may be molded with the hands, typically consisting of hydrous silicate of aluminium. Clay is the result of the wearing down and decomposition, in part, of rocks containing aluminous minerals, as granite. Lime, magnesia, oxide of iron, and other ingredients, are often present as impurities.

"Clay to surfactant ratio" or "C/S ratio" means or refers to a fraction in which the weight percentage of clay is the numerator and the weight percentage of the surfactant is the denominator.

"$C_x$" or "$C_x$–$C_y$" are symbols with values x or x and y representing the primary distribution of carbon atoms present. For example, $C_{12}$–$C_{15}$ refers to a carbon atom group having a primary carbon atom distribution of from about 12 to about 15 carbon atoms including various homologous isomeric structures. Manufactured products may include carbon atom groups having carbon atoms outside the stated number or range, for example, when naturally-occurring fatty moieties are utilized as the source of the alcohols.

"Gel stability" or "stable gel structure" means or refers to compositions which have a viscosity which remains generally constant to slightly increasing over time and which have composition constituents which remain generally dispersed, or generally homogenous, over time. In other words, the composition remains generally stable. For roof coating compositions, it is accepted and recommended that the determination of gel stability or stable gel structure be made about four weeks after manufacture.

An "oxidized asphalt" means or refers to an asphalt which has been treated by blowing air through it at elevated temperatures to produce physical properties required for the industrial use of the final product. An "unoxidized asphalt" is an asphalt product which has not been oxidized.

A "rapid curing asphalt" means or refers to an asphalt cutback composed of asphalt and a naptha or gasoline-type diluent of high volatility. "Slow and medium curing asphalts" are, respectively, asphalt cutbacks composed of asphalt, kerosene and gas oils of low or medium volatility.

A "propoxy group" refers to a three carbon atom alkyloxy group attached to the parent molecular moiety through an oxygen atom.

"Surfactant" (surface active agent) means or refers to a molecule (or molecules) that, when added to another material at low concentration, changes the properties of that material at a surface or interface. The surfactants described herein are useful to improve wetting and spreading, to emulsify and disperse, to couple or compatibilize formulation components and to modify and stabilize viscosity.

Surfactants useful in the asphalt-based coating compositions are salts comprising a propoxylated alcohol-based ether amine constituent and an anion derived from an acid. Surfactants for use in formulating the asphalt-based coating compositions have the general structure represented by the formula I:

$$[R_1-O-(CH_2CHO)_m-R_2-NH_3]^+ \ X^- \qquad (I)$$
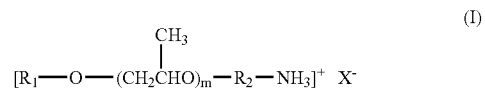

wherein, $R_1$ is a linear, branched or cyclic, saturated or unsaturated aliphatic or alkylaryl group having between about 8 to about 24 carbon atoms, m is an integer from 1 to about 4, $R_2$ is an n-propyl or iso-propyl group and X— is an anion. The surfactant constituent may comprise one type of propoxylated alcohol-based ether amine salt according to formula I or a combination, or mixture, of different propoxylated alcohol-based ether amines and salts.

The anion X— is preferably the negatively charged ion of an organic or inorganic acid used to prepare the propoxylated alcohol-based ether amine salt. Preferred acids are organic acids having branched, linear and cyclic structures. Representative organic acids suitable for use in forming the anion include benzoic acid, isooctanoic acid, formic acid, acetic acid, hydroxyacetic acid, propionic acid, isobutyric acid, isophthalatic acid, phthalatic acid, butyric acid, dimer acids, oil-derived acids. Neo acids such as neodecanoic acid, neooctanoic acid and neotridecanoic acid may be utilized. Other inexpensive "bottom stream" organic acids resulting from the distillation residues of purified organic acids could also be utilized. Acetic and formic acids are highly preferred because of their competitive cost and broad availability. Mixtures of organic acids may be utilized. Representative inorganic acids include hydrochloric acid, phosphoric acid, polyphosphoric acid, sulfuric acid and others. Mixtures may be utilized.

It is preferred that $R_1$ is a branched, straight chained or cyclic, saturated or unsaturated aliphatic or an alkylaryl group of from about 8 to about 24 carbon atoms. It is highly preferred that $R_1$ is an aliphatic group having about 10 to about 18 carbon atoms. Most preferably, $R_1$ is an aliphatic group having about 12 to about 15 carbon atoms. Propoxylated alcohol-based ether amines may have a distribution of carbon atoms at $R_1$ and may include various homologous isomeric structures.

Preferably, $R_1$ is derived from aliphatic alcohols. Examples include $C_{12}$–$C_{16}$ coco-based alcohols, $C_{16}$–$C_{18}$ tallow-based alcohols, $C_{18}$–$C_{22}$ rapeseed-based alcohols, and unsaturated alcohols such as $C_{18}$ oleyl-based alcohols and $C_{18}$–$C_{22}$ soya-based alcohols. Fatty alcohols derived from natural fats and oils are desirable because of the low cost and ready availability of such materials.

Fatty alcohols derived from petroleum products are also useful. Examples include Neodol brand $C_9$–$C_{11}$, $C_{11}$, $C_{12}$–$C_{13}$, $C_{12}$–$C_{15}$, $C_{14}$–$C_{15}$ and $C_{16}$–$C_{17}$ highly linear alcohols available from Shell Chemical, LP of Houston, Tex. and Exxal® brand $C_{10}$, $C_{12}$ and $C_{13}$ branched alcohols available from ExxonMobil® Chemical Company of Houston, Tex.

Representative alkylaryl alcohols for use at $R_1$ are substituted phenols. Octylphenol, nonylphenol and dinonylphenol are examples.

Surfactant liquidity may be improved when $R_1$ includes branched or cyclic groups rather than linear groups. Liquidity is also enhanced when $R_1$ bears unsaturation.

The character "m" is an integer which represents the number of propoxy groups associated with the propoxylated alcohol-based ether amine. Most preferably, the addition of such propoxy groups results from the addition of from one to four molar equivalents of propylene oxide per molar equivalent of alcohol during synthesis of the amine as described in detail below. Surfactants may include a distribution of propoxy groups.

Notably, surfactant liquidity is improved as the number of moles of propylene oxide added and the value of m are increased. Increasing the value of m will enable the formulator to maintain surfactant liquidity even as the number of carbon atoms at $R_1$ is increased and the branching of $R_1$ is decreased resulting in more linear conformations at $R_1$. This permits the formulator to utilize the less expensive naturally-derived fatty linear alcohols as reagents. The liquidity properties resulting from the employment of the propoxy moiety represents an advantage which facilitates and expands formulation alternatives and controls costs.

In a specific preferred embodiment, $R_1$ is between about 12 and about 15 carbon atoms, m is from 1 to 4 representing from one to four propoxy groups, $R_2$ is a linear aliphatic n-propyl group and X— is an acid-derived anion as described in connection with formula I. Such preferred embodiment has the general structure represented by the formula II:

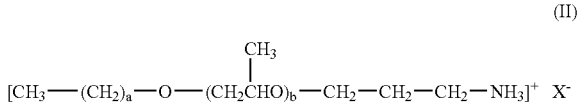
(II)

wherein a is an integer from 11 to 14, b is an integer from 1 to about 4 and X— is defined as in formula I.

In a further specific preferred embodiment, $R_1$ is between 12 and 14 carbon atoms, m is 1 representing one propoxy group, $R_2$ is a branched aliphatic iso-propyl group and X— is an acid-derived anion as described in connection with formula I. Such preferred embodiment has the general structure represented by the formula III:

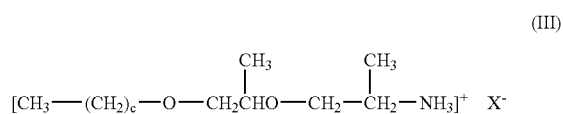
(III)

wherein c is an integer from 11 to about 13 and X— is defined as in formula I. Combinations of salt surfactants of formulae II and III may be utilized.

It is preferred, but not required, that the acid which provides the anion represented by X— is present in an amount approximately sufficient to neutralize the amine. The surfactant will be efficacious at lesser acid amounts but may have unwanted properties such as a noticeable odor resulting from excess amine.

Coating compositions have been found to have improved efficacy in embodiments including an acid constituent present in an amount in excess of that necessary to neutralize the amine. It is also advantageous to formulate the surfactant constituent using a relatively greater amount of the acid because the acid is typically less expensive than the amine. Preferably, the acid is present in an amount of about 1 to about 2.50 times the amount needed to neutralize the amine (i.e., about 1 to about 2.50 molar equivalents of acid) although this is not an absolute or essential range. Use of excess amounts of the acid was not observed to have a diluent effect and did not reduce the efficacy of the surfactant or cause a decrease in the viscosity of coating compositions as described herein. No deleterious side effects, such as an offensive odor, were noted by the presence of the excess acid. Commonly owned U.S. Pat. No. 5,618,340 explains that an ether-amine-acid complex is formed when up to 3 molar equivalents of acid are present and bound by the ether-amine-acid complex and that this complex may contribute to improved efficacy while avoiding unwanted odors that can result from unbound acids. The contents of U.S. Pat. No. 5,618,340 are incorporated herein by reference.

The propoxylated alcohol-based ether amine used in the surfactant is typically liquid at room temperature and is capable of being handled and admixed easily during manufacture and use. Propoxylated alcohol-based ether amines used in formulating the surfactant do not need to be heated prior to use, thus avoiding any risk of fire. As non-propoxylated alcohol-based ether amines with linear 12–22 carbon atom aliphatic groups at $R_1$ would be solid at room temperature, it was surprising that the propoxylated alcohol-based ether amines would have liquidity when m is as little as 1. This unexpected result would indicate that the presence of the propoxy group or groups or branching at $R_1$ are particularly effective at imparting liquidity to the molecule. In addition, propoxylated alcohol-based ether amines are not corrosive. When formulated with a non-corrosive acid, the asphalt-based coating compositions may be stored in metal containers and applied to metal-containing surfaces without corrosive effects.

The asphalt cutback is the predominant formula constituent of the composition and the amount of such asphalt cutback does not vary greatly with respect to the amount of clay and surfactant of such composition. The asphalt cutbacks best suited for this invention may be medium-cure (MC) cutbacks, rapid-cure (RC) cutbacks, or even slow-cure (SC) cutbacks. The asphalt cutback may be oxidized or unoxidized. Mixtures of asphalt cutbacks can be used.

A range of different clay material types may be used. Attapulgite clays are particularly preferred for use in roof coating compositions. Attapulgite clays are specially-sized and processed gelling clay products suitable for thickening asphalt-based coatings. As is known, attapulgite clays (sometimes referred to as "Fuller's Earth") are composed largely of the mineral palygorskite, a hydrated magnesium aluminum silicate hydroxide $((Mg, Al)_2Si_4O_{10}(OH)\cdot 4H_2O)$. Other clays such as the bentonite, ball, sepiolite or kaolin-type clays may be used. The preferred attapulgite clays are specifically sized after the mining process to provide a small uniform particle size with a large surface area which maximizes their efficacy to provide improved viscosities. Mixtures of clays may be used.

The asphalt cutback, clay and surfactant base constituents can be utilized across a broad range of constituent weight percentage ranges to formulate asphalt-based coating compositions with properties desired by the formulator and/or the end user. It is preferred that the asphalt cutback comprises from about 50 to about 98 weight percent of the coating composition. When the asphalt cutback is provided in this range, it is preferred that the clay comprises from about 1.7 to about 47.4 weight percent of the coating composition and that the surfactant comprises about 0.1 to about 7.1 weight percent of the coating composition.

Compositions having relatively less asphalt cutback and more clay will tend to be highly viscous compositions, such as mastics. Compositions having relatively more asphalt cutback and less clay will tend to be less viscous because of the relatively greater amounts of the solvent-containing asphalt cutback present. Such compositions may be suitable for use as spray-applied coatings.

In more highly preferred embodiments, typical of roof coating compositions, asphalt cutback comprises from about 80 to about 98 weight percent of the coating composition. When the asphalt cutback is provided in this range, it is preferred that the clay comprises from about 1.7 to about 19.0 weight percent of the coating composition and that the surfactant comprises about 0.1 to about 3.0 weight percent of the coating composition. Asphalt-based coating compositions having base constituents within these preferred ranges can easily be formulated to have a stable gel structure.

In more highly preferred embodiments, particularly well-suited for use in roof coating compositions, asphalt cutback comprises from about 83 to about 88 weight percent of the coating composition. When the asphalt cutback is provided in this range, it is preferred that the clay comprises from about 10.3 to about 16.1 weight percent of the coating composition and that the surfactant comprises about 0.6 to about 2.4 weight percent of the coating composition.

The above weight percent ranges represent asphalt-based coating compositions having C/S ratios in the range of about 6:1 to about 18:1. The amount of surfactant utilized in a particular coating composition may be adjusted to achieve a desired C/S ratio. If cost savings are desired, a C/S ratio in excess of 10:1 or 12:1 is preferred because such ratio implies use of a relatively lesser amount of the more expensive surfactant constituent and a relatively greater amount of the less expensive clay constituent. As described below, and shown in the figures, surfactants described herein can be used at C/S ratios of 12:1 to 16:1 to achieve the same performance as known surfactants at lower C/S ratios on the order of 8:1. Such surfactant efficacy represents a significant performance and cost advantage to the formulator.

Asphalt-based coating compositions can be formulated with C/S ratios below 6:1 and above 18:1 depending on the preferences and needs of the formulator and/or end user. While asphalt-based coating compositions have efficacy at C/S ratios below 4:1, such compositions are not preferred because of the increased cost associated with the use of relatively greater amounts of surfactant.

Fillers and other additives may optionally be incorporated into the coating compositions as a means of modifying the consistency and mechanical properties of the coatings. Fillers are also useful to provide bulk and reinforcement and shrinkage control to the composition after application. Useful fillers include sand, mica, ground slate, diatomaceous earth, ground limestone, wollastonite, pearlite, cellulosic fibers, talc, and polyolefin fibers.

If provided, such fillers may comprise about 2 to about 50 weight percent of the total composition. The foregoing range is a very general range. Fillers are added in amounts as needed to provide desired properties in the composition. The specific precise amount of filler used in any particular coating will vary greatly depending on the specific type of filler to be used and the performance benefit sought to be achieved.

Other additives may include solvents such as co-hydrocarbons, mineral spirits, naptha, kerosene and Number 2 fuel oil. If provided, such solvents may comprise about 5 to about 30 weight percent of the total composition. As with the filler constituent, the specific amount of solvent used in any particular coating will vary greatly depending on the specific type of solvent and the performance benefit sought to be achieved.

The weight percentages set forth herein are provided to establish useful composition ranges. While generally not preferred, asphalt-based coating compositions as described herein have efficacy when provided in amounts outside the stated weight percentage ranges. Put another way, asphalt-based coating compositions are not inoperable because the constituents are slightly outside the stated ranges.

Asphalt-based coating compositions as described herein have excellent gel stability properties without any requirement for asbestos and may be manufactured free of asbestos. Although not preferred, asbestos could be included as an additive as required and desired by the formulator or end user.

Representative sources of asphalt cutbacks are: Exxon 7057, an MC cutback available from Exxon Corporation, Houston, Tex., Gardner cutback, an MC cutback available from Gardner-Gibson, Inc. of Tampa, Fla., Trumbull 6009 and 6089 (oxidized) and 6032 and 6052 (unoxidized) available from Trumbull Asphalt of Summit, Ill. and the asphalt cutback from Asphalt Products Company of Baltimore, Md. Suitable asphalt cutbacks are available from many other sources.

Representative sources of clays include Min-U-Gel G-35, an attapulgite available from Floridin Company of Hunt Valley, Mass. Other useful attapulgite clays are sold under the tradenames ATTAGEL 20, 30, 36, 17 and 19 by Engelhard Corporation of Edison, N.J. Yet other attapulgite clays which may be used include PlayGel JT-NA and MT from MinTech International, Inc. of Hadley, Pa. and Bentolite WH from Southern Clay Products of Gonzales, Tex. Such clays are available commercially in a range of particle sizes. Other clays may be used, but the attapulgites are highly preferred.

Tomah Products, Inc. of Milton, Wis. is a source of the propoxylated alcohol-based ether amine constituent which may be utilized to make the salt surfactant of formulae I–II. Representative Tomah Products amines include the following Neodol brand or Exxal brand alcohol-based products: Neodol 11 alcohol-based 1-P1-PA (also referred to as Neodol 1-P1-PA), Exxal 10 alcohol-based 10-P1-PA (also referred to as Exxal 10-P1-PA), Exxal 13 alcohol-based 13-P1-PA (also referred to as Exxal 13-P1-PA), Neodol 25-P1-PA, Neodol 25-P2-PA, Neodol 45 alcohol-based 45-P1-PA (also referred to as Neodol 45-P1-PA) and Neodol 45 alcohol-based 45-P3-PA (also referred to as Neodol 45-P3-PA). The propoxylated alcohol-based ether amine constituent of formula III is available from the Huntsman Corporation of Houston, Tex. under the tradename Surfonamine ML-300®. As noted, Tomah Products is the source of the industry standard decyloxypropylamine acetate surfactant which is sold under the tradename PA-14 Acetate™.

Suitable acid precursors for use in formulating the surfactants are readily available from commercial sources. Representative acids include, without limitation, formic, hydrochloric, and phosphoric acids available from J. T. Baker of Phillipsburg, N.J. Further representative acids are benzoic acid from Velsicol Chemical Corp. of Rosemont, Ill. and acetic and propionic acids from J. T. Baker. Yet further representative acids are hydroxyacetic acid (Aldrich Chemical Co. of Milwaukee, Wis.) and butyric and isobutyric acid from Hüls America, Inc. of Piscataway, N.J. Neo acids are available from ExxonMobil.

Many dimer acids are useful in this invention. A commercial source of useful tall-oil-based acid dimers, oleic acid dimers and linoleic acid dimers is the Cognis Corporation of Cincinnati, Ohio.

The natural oil-derived alcohols useful in formulating surfactants are well known to the art and are obtained by saponification of the polyglyceride esters present in the respective precursor oils. Illustrative alcohols may be based on corn oil from Arizona Chemical Co. of Panama City, Fla., cottonseed oil from Witco Corporation, Humko Chemical Division, Memphis Term., linseed oil and soy oil available from the Procter and Gamble Co., of Cincinnati, Ohio and tall oil sold by Westvaco Corporation, Charleston Heights, S. C. Cognis Corporation is a source of natural oil-derived alcohols.

The viscosity of roof coating composition embodiments formulated with the base constituents may be described as pseudoplastic and thixotropic. Such properties are shown by: the gel stability of the compositions; their relatively high viscosity at low shear rates; their relatively low viscosity at high shear rates; their good uniformity in viscosity reduction in response to uniform shear applied over a period of time; and their good recoverability, that is, recovery of initial properties after shear has ended.

Surfactants as described herein are effective in imparting a stable gel structure to the roof coating composition embodiments. Gel stability contributes to stabilizing the final coating composition against settling and separation over long periods in storage. The coating compositions have a high viscosity at low shear rates and a low viscosity at high shear rates. A high viscosity at low shear rates maintains mix uniformity during processing, packaging and application. A low viscosity at high shear rates makes application easier.

Roof coating embodiments as described herein also have good recoverability of viscosity after application. Such good recoverability of viscosity minimizes sag and flow after application while solvent evaporation is occurring.

The viscosity of exemplary asphalt-based coatings as described herein, which are formulated for use in roof coating applications, is preferably in the range of about 60,000 to about 300,000 centipoise (cP). This is a preferred range; excellent roof coating compositions can be formulated with viscosities outside this range, particularly below the range. There is no particular viscosity at which a stable gel structure is achieved. The greater the viscosity, the better the opportunity for the formulator to use less surfactant thereby increasing the C/S ratio and reducing cost while still providing a composition with excellent viscosity. A stable gel structure can usually be inferred if the viscosity remains essentially unchanged to slightly enhanced over a four week interval. A Brookfield Viscometer Model RVT at 10 RPM with a No. 7 spindle (Brookfield Engineering Laboratories, Middleboro, Mass.) may be used to determine viscosity.

Other asphalt-based coating compositions can be formulated to be significantly less viscous. Such compositions need not be pseudoplastic and thixotropic or have recoverability. Examples are driveway sealers and spray-applied coatings.

As indicated in the figures and the data accompanying the Examples, coating compositions as described herein have viscosity properties which are comparable to or better than the current industry standard products which include surfactants based on decyloxypropylamine acetate salts, but at much lower C/S ratios. As already noted, having the capability of making coating compositions with C/S ratios in the ranges of 12:1 to 16:1 means that the same performance can be achieved with less of the more costly surfactant component thereby controlling cost.

While not wanting to be bound by any particular theory, coating compositions including the propoxylated alcohol-based ether amine salts are believed to be efficacious for at least several reasons. The surfactant is highly effective at dispersing the coating constituents because the carbon atoms of the $R_1$ group bond well with the carbon-containing asphalt cutback and the protonated nitrogen head group effectively bonds with water in the clay.

Branching of the propoxy group or groups is believed to provide the surfactant with excellent liquidity. Previously, such liquidity was attained only by utilizing branched aliphatic groups at the $R_1$ position because surfactants with linear aliphatic groups at $R_1$ are solid at room temperature as illustrated in Example 101.

The present surfactant, however, derives liquidity from the propoxy group or groups. Advantageously, less expensive naturally-occurring linear fatty alcohol moieties can be utilized as reagents. The unexpected result is a coating composition which is efficacious at surfactant concentrations less than previously attainable, which has excellent liquidity properties and which permits the formulator to further control cost.

While salt surfactants as described herein have utility as constituents of asphalt-based coating compositions, it is envisioned that certain salt surfactants may have utility for applications other than asphalt-based coating compositions.

Preparation of Exemplary Compositions

Preparation of the inventive coating compositions will vary somewhat depending on the particular constituents to be used in the compositions, the type of mixing apparatus available for processing of the constituents and the intended use. These processing steps are not critical and, while considerable variation is possible, certain blending procedures as described herein are preferred.

The representative propoxylated alcohol-based ether amine precursor to the salt shown in formula II is a monoamine derived from a propylene oxide adduct of $C_{12}$–$C_{15}$ alcohols. In a process well known to those of skill in the art, isolated or mixed $C_{12}$-$C_{15}$ alcohols are reacted with propylene oxide in the presence of a catalyst (such as sodium hydroxide or potassium hydroxide). The hydroxyl group of the alcohol reacts with the propylene oxide to produce monoethers of propylene oxide. Addition of 2–4 moles of propylene oxide per mole of alcohol yields di, tri and poly(propylene glycol) ethers. In a subsequent cyanoethylation process, the reaction product of the preceding step is reacted with acrylonitrile (2-Propenenitrile) to yield an ethemitrile. Reduction of the ethemitrile yields the corresponding synthetic propoxylated alcohol-based ether amine.

Synthesis of the representative propoxy-based ether amine precursor to the salt of formula III differs from that of the composition of formula II only in that the propoxylated alcohol is reacted with excess ammonia while displacing water. Application of a vacuum to remove the water and excess ammonia yields the corresponding synthetic ether amine as in formula III.

The salt surfactant is prepared by admixing the propoxylated alcohol-based ether amine precursor with the selected acid. The acid may be present in any suitable amount but is most preferably present in an amount required to neutralize the amine. And, the acid may be present in an amount in excess of the amount required to neutralize the amine. It has been found that excess amounts of acid can produce performance benefits. For example, acid may be present in an amount of about 1 to about 2.5 times the amount required to neutralize the amine (i.e., about 1 to about 2.5 molar equivalents of acid). From a cost-reduction standpoint, an optimum surfactant includes the greatest possible ratio of acid to propoxylated alcohol-based ether amine because the acid costs much less than the propoxylated alcohol-based ether amine.

Preferably, the asphalt cutback, clay and surfactant are admixed together. While the admixing steps are not critical and considerable variation is possible, certain procedures are preferred. Blending of the asphalt, clay and surfactant tends to vary based on the processing equipment to be used. In general, if a high-shear mixer is used, the preferred order of addition involves first mixing the asphalt cutback, surfactant, and clay until they are gelled. Then any fillers are added and mixed with the gelled composition. If low-shear equipment, such as a paddle or ribbon mixer, is employed (or if the clay concentration is low in a high-shear mixer batch), the use of a pre-gelling technique is recommended to enhance gelling and optimize dispersion.

The preferred pre-gelling process consists of thoroughly mixing all of the surfactant with all of the clay and a portion of the asphalt cutback (preferably about two-thirds) until a thick gel is formed. Then the remainder of the cutback and all of the filler(s) are added and thoroughly mixed. Additional solvent can be added if required after the mix is uniform.

The choice and amount of fillers added in the mix depend in part upon the end use of the product. For example, whether the composition is to be a brushable roof coating, a sprayable coating, or a roof cement. The desired final viscosity and texture of the asphalt-based coating composition can be adjusted either by modifying the amount of cutback and clay present, the C/S ratio or by modifying the fillers which are added.

Determining the optimum amount of the surfactant salt in a coating is useful with respect to performance and cost. For a roof coating composition, the optimum is considered the least amount of surfactant (that is, the highest C/S ratio) providing the desired gel characteristics and stability. The optimum ratio depends primarily on the specific propoxylated alcohol-based ether amine and acid precursors selected, the asphalt cutback used, the degree of asphalt oxidation, and the clay used. Therefore, an optimum ratio must be determined for each combination.

One method of determining the optimum C/S ratio is to run a ladder of C/S ratios in a mix of a particular ratio of the chosen clay to the combination of the surfactant and chosen asphalt cutback; for example, about 12 weight percent (or parts) clay to about 88 weight percent (or parts) asphalt cutback and surfactant combined. The C/S ratio may then be varied in increments within what is considered an acceptable range. The range of ratio increments tested need not be broad, but may start, for example, around 8:1 and extend to 16:1. During this experimentation, readings on the viscosity and gel stability characteristics of the resulting compositions should be taken at periodic intervals after mixing. These readings may be taken after 24 hours and at intervals thereafter for a time period of one to four weeks after mixing. Temperature and pressure conditions should preferably be controlled during the period of such testing. The optimum C/S ratio may then be used as a guide for scaled-up production of asphalt-based coating compositions.

The instruments and procedures for measuring gel characteristics are well known in the art. As noted a Brookfield RVT viscometer may be used to determine viscosity but any appropriately sensitive test instrument (such as a good penetrometer) may be used. It is preferred, but not required, that the test procedure set forth in ASTM D2196-81 is used to determine viscosity, but any reliable test procedure will be acceptable.

For roof coating compositions, large variations in the readings of the gel characteristics over the course of the test period indicate a lack of gel stability. This tends to indicate an unacceptable C/S ratio or some other unacceptable characteristic in the formula. Steady or slightly increased readings are what is desired, provided they show sufficient gel stability over an extended period of time.

Compositions according to this invention are applied to various surfaces in the same manner as known coating compositions. They are usable as roof coatings, roof cements, vehicle undercoatings, pipe coatings, mastics and adhesives, and for many other purposes.

EXAMPLES AND DATA

In each of the examples which follow, an asphalt-based coating composition was made using a low-shear blending technique, adding and mixing the listed constituents in the manner described above. For each example, the formulation is listed and comments regarding the formulation or the resulting composition are given.

Examples 1–6—Base Formulations

Examples 1–6 represent exemplary asphalt-based roof coating compositions. Each of Examples 1–6 includes unoxidized asphalt, attapulgite clay and a propoxylated alcohol-based ether amine salt surfactant. No other constituents were included.

Examples 1–4 include a comparative industry standard roof coating composition based on Tomah Products PA-14 Acetate surfactant. The industry standard roof coating composition comprises unoxidized Henry Company asphalt cutback, Minugel G-35 attapulgite clay and Tomah Products' PA-14 Acetate surfactant (isodecyloxypropyl amine acetate salt surfactant). The industry standard composition was provided at 8:1 and 12:1 C/S ratios as indicated in Examples 1–4.

The low shear blending technique referred to above was used to prepare each asphalt-based coating composition and the standards. In each example, 350 gram samples were prepared with clay to surfactant ratios of 8:1, 12:1 and 16:1 as indicated in Table 1. The standards were prepared in the 350 gram amounts but at C/S ratios of 8:1 and 12:1.

TABLE 1

|  | C/S Ratio and Constituent Amount (wt. %/grams) | | |
| --- | --- | --- | --- |
| Constituent | 8:1 | 12:1 | 16:1 |
| Asphalt Cutback | 85 wt. % 297.5 g | 85 wt. % 297.5 g | 85 wt. % 297.5 g |
| Surfactant | 1.7 wt. % 5.9 g | 1.2 wt. % 4.2 g | 0.9 wt. % 3.1 g |
| Clay | 13.3 wt. % 46.6 g | 13.8 wt. % 48.3 g | 14.1 wt. % 49.4 g |
| Total | 100 wt. % 350.0 g | 100 wt. % 350.0 g | 100 wt. % 350.0 g |

Table 2 identifies sources of the asphalt-cutback and clay used to make the samples of Examples 1–6. The surfactant utilized is described in each example. The surfactant utilized for each composition included from about 1 to about 2 molar equivalents of acetic acid relative to the propoxylated alcohol-based ether amine as indicated in each example.

TABLE 2

|  | Constituent Source | | |
| --- | --- | --- | --- |
| Constituent | Examples 1–4 | Example 5 | Example 6 |
| Asphalt Cutback | Henry Company Asphalt Cutback | Karnak Asphalt Cutback | Henry Company Asphalt Cutback |
| Surfactant | See Example | See Example | 25-P1-PA Acetate |
| Clay | Minugel G-35 Attapulgite Clay | Minugel G-35 Attapulgite Clay | See Example |

Viscosity data for each example and the roof coating compositions based on the industry standard surfactant are presented below in centipoise units (cP). Viscosity measurements were taken at one day and then at weekly intervals through four weeks according to ASTM D2196-81 using a Brookfield RVT viscometer with a #7 spindle at 10 RPM.

FIGS. 1–6 present the data for Examples 1–6. As indicated in FIGS. 1–6, minor fluctuations in the data points representing viscosity measurements are expected. Viscosity measurements are expected to vary slightly based on factors such as ambient temperature at the time the viscosity measurement is taken, the operator taking the viscosity measurement and inherent difficulties in determining exact viscosities of highly viscous compositions. Gel stability is best indicated by viscosities which remain high over an extended four week time period.

Viscosities after four weeks in the range of 60,000 to 130,000 cP represent excellent viscosities for a roof coating composition. Asphalt-based coating compositions with preferred viscosities after four weeks of 60,000 cP represent coating compositions with a stable gel structure which will not separate into fractions and will be effective as a stable, usable composition. Stable gel structures can be achieved with viscosities of less than 60,000 cP. Such compositions have the appearance of thick, viscous coatings.

Example 1

Example 1 includes three asphalt-based roof coating compositions. The roof coating compositions of Example 1 included unoxidized asphalt, attapulgite clay and Neodol 25 alcohol-based 25-P11-PA acetate surfactant constituents. Neodol 25-P1-PA is a propoxylated alcohol-based ether amine according to formula II. Neodol 25-P1-PA contains a distribution of carbon atoms at the position $R_1$. $R_1$ is an aliphatic group having about 12 to 15 carbon atoms, m is 1 and $R_2$ is an n-propyl group. The Neodol 25-P1-PA was fully neutralized with about 1 molar equivalent of acetic acid (i.e., about 100% neutralization). Roof coating compositions including the industry standard PA-14 Acetate surfactant are included to provide a basis of comparison.

Table 3 provides viscosity data at four weeks following manufacture. FIG. 1 presents the viscosity data over four weeks for each sample in graphical form. The data are presented in centipoise (cP) units.

TABLE 3

| C/S Ratio | Approx. Neutralization (%) | Four Week Viscosity (cP) |
| --- | --- | --- |
| 8:1 | 100 | 276,000 |
| 12:1 | 100 | 290,000 |
| 16:1 | 100 | 88,000 |

The data show that the 8:1 C/S ratio exemplary and industry standard compositions far exceeded the preferred 60,000 to 130,000 cP range. Unexpectedly, the 12:1 and 16:1 C/S ratio coating exemplary compositions also exceeded the desired preferred viscosity range and exceeded the 12:1 C/S ratio industry standard indicating that excellent viscosity is achieved with relatively less surfactant. The compositions of Example 1 (and standards) were all homogenous after four weeks. All of these compositions (including the 8:1 and 12:1 C/S ratio standards) represent excellent asphalt-based roof coating compositions with stable gel structures.

Example 2

Example 2 includes four asphalt-based roof coating compositions again based on Neodol 25 alcohol-based 25-P1-PA propoxylated alcohol-based ether amine. The amine was oveneutralized with either 1.5 or 2 molar equivalents of acetic acid (respectively 150% and 200% neutralized) and compositions were formulated with a C/S ratio of either 8:1 or 12:1. An asphalt-based coating composition including the industry standard PA-14 Acetate surfactant at an 8:1 C/S ratio is included in FIG. 2 to provide a basis of comparison.

Figure 2:
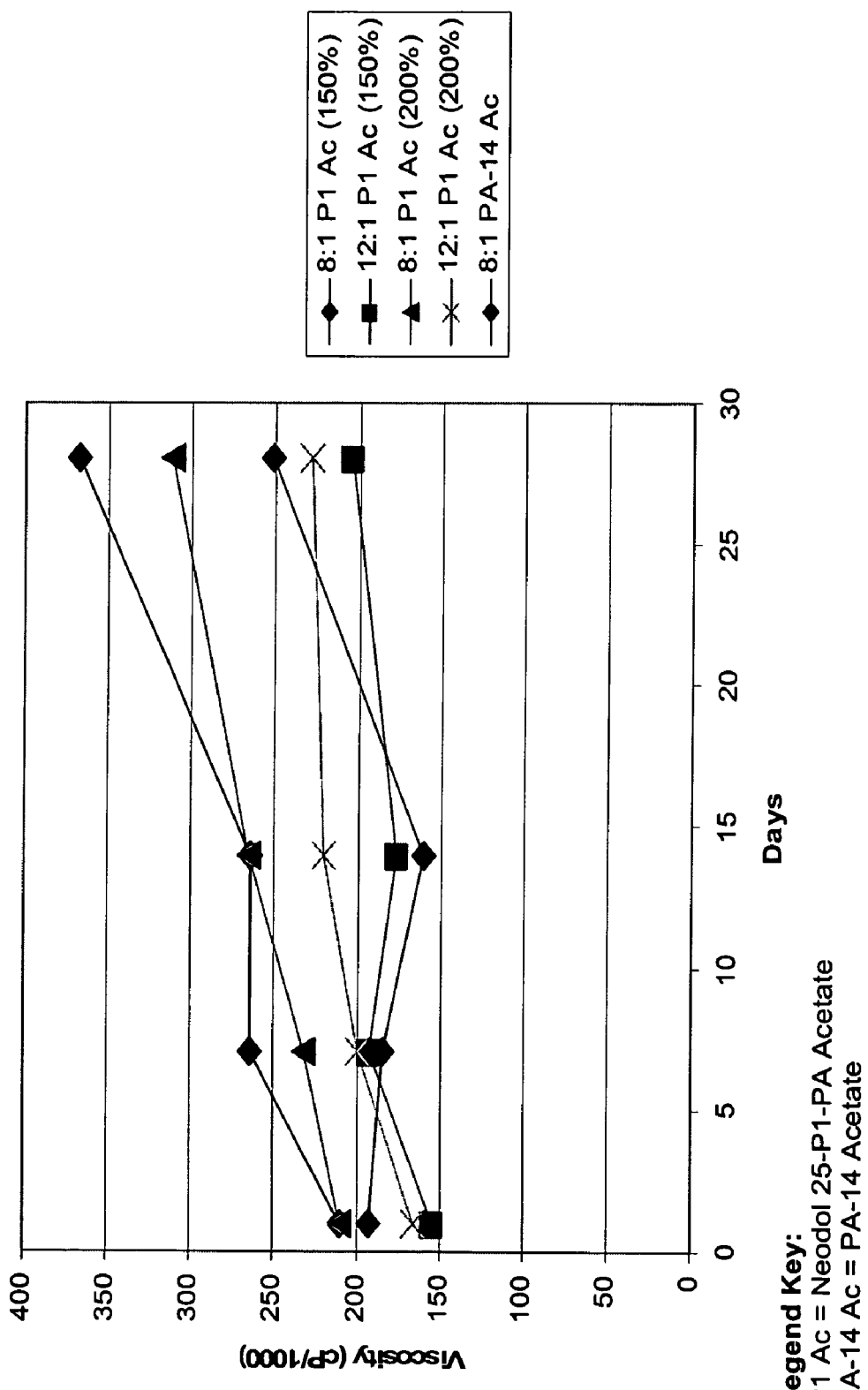
FIG. 2 is a graph showing the viscosities of exemplary asphalt-based roof coating compositions including a surfactant consisting of an overneutralized Neodol 25 alcohol-based 25-P1-PA Ac ether amine acetate salt at C/S ratios of 8:1, 12:1 and 16:1. Exemplary asphalt-based coating compositions including PA-14 Acetate salt surfactant at C/S ratios of 8:1 and 12:1 are included for comparison.

Table 4 presents the viscosity data for each sample after four weeks. FIG. 2 graphically presents the viscosity data for the exemplary and standard compositions over the four weeks taken at the time indicated.

TABLE 4

| C/S Ratio | Approx. Neutralization (%) | Four Week Viscosity (cP) |
|---|---|---|
| 8:1 | 150 | 368,000 |
| 12:1 | 150 | 204,000 |
| 8:1 | 200 | 312,000 |
| 12:1 | 200 | 228,000 |

The data show that the 8:1 C/S ratio compositions with 1.5 and 2 molar equivalents of acetic acid had viscosities which were better than the counterpart 8:1 C/S ratio standard composition. The 12:1 C/S ratio compositions with 1.5 and 2 molar equivalents of acetic acid had excellent viscosities, although such viscosities were less than that of the 8:1 C/S ratio standard. The compositions of Example 2 (and the standard) were all homogenous after four weeks. Each exemplary composition of Example 2 has superior viscosity and a stable gel structure while utilizing relatively increased amounts of the less expensive acetic acid constituent.

Example 3

Example 3 includes four exemplary asphalt-based roof coating compositions and two standards. The roof coating compositions of Example 3 include unoxidized asphalt, attapulgite clay and Neodol 25 alcohol-based 25-P2-PA acetate surfactant constituents. The Neodol 25-P2-PA surfactant is a distribution wherein $R_1$ includes about 12 to 15 carbon atoms, m is 2 and $R_2$ is an n-propyl group. The 25-P2-PA was fully neutralized with about 1 molar equivalent of acetic acid (i.e., approximately 100% neutralized).

Figure 3:
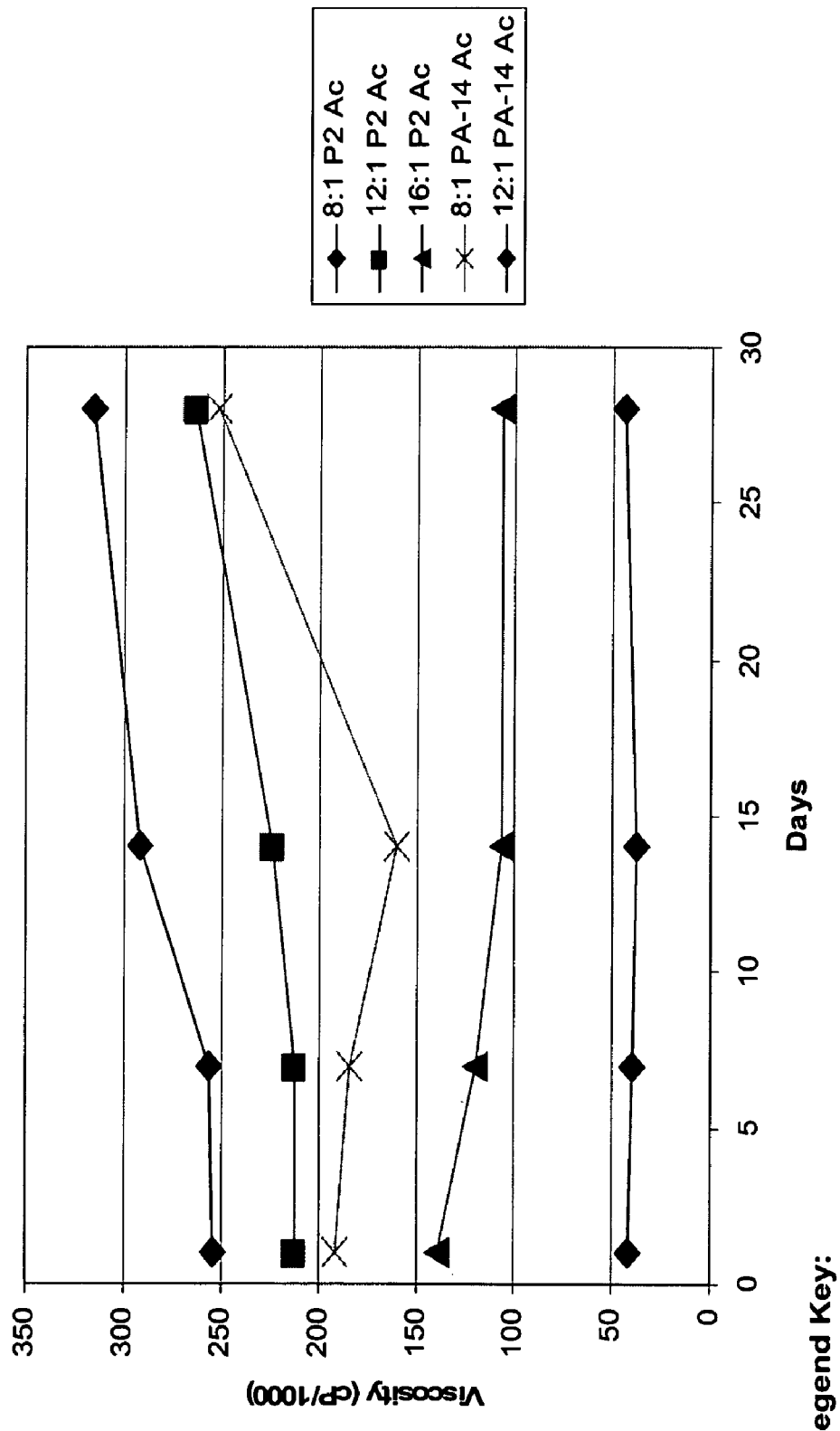
FIG. 3 is a graph showing the viscosities of exemplary asphalt-based roof coating compositions including a surfactant consisting of a neutralized propoxylated (two molar equivalents) $C_{12}$–$C_{15}$ alcohol-based ether amine acetate salt (Neodol 25 alcohol-based 25-P2-PA Ac also referred to as Neodol 25-P2-PA Ac) at C/S ratios of 8:1, 12:1 and 16:1. Exemplary asphalt-based coating compositions including PA-14 Acetate salt surfactant at C/S ratios of 8:1 and 12:1 are included for comparison.

Table 5 provides the four week viscosity data. FIG. 3 presents the viscosity data for each composition in graphical form over the four weeks at the indicated time intervals. Data are provided in centipoise (cP) units. Two asphalt-based coating compositions including PA-14 Acetate surfactant at C/S ratios of 8:1 and 12:1 are included in FIG. 3 for comparison.

TABLE 5

| C/S Ratio | Approx. Neutralization (%) | Four Week Viscosity (cP) |
|---|---|---|
| 8:1 | 100 | 316,000 |
| 12:1 | 100 | 264,000 |
| 16:1 | 100 | 106,000 |

All of the exemplary and industry standard roof coating compositions had excellent viscosities and were homogenous after four weeks indicating that the compositions had stable gel structures. The data also show that the exemplary compositions having C/S ratios of 8:1 and 12:1 outperform the 8:1 standard and that the 16:1 C/S ratio exemplary composition outperforms the 12:1 C/S industry standard. The data indicate that excellent viscosity is achieved with relatively less surfactant.

Example 4

Example 4 includes four exemplary asphalt-based roof coating compositions and one standard. The samples of Example 4 each included a Neodol 25 alcohol-based 25-P2-PA propoxylated alcohol-based ether amine oveneutralized with either 1.5 or 2 molar equivalents of acetic acid (respectively about 150% and 200% neutralized). Sample compositions were formulated with a C/S ratio of either 8:1 or 12:1. The 8:1 C/S ratio industry standard roof coating of Example 1 is included to provide a basis of comparison.

Figure 4:
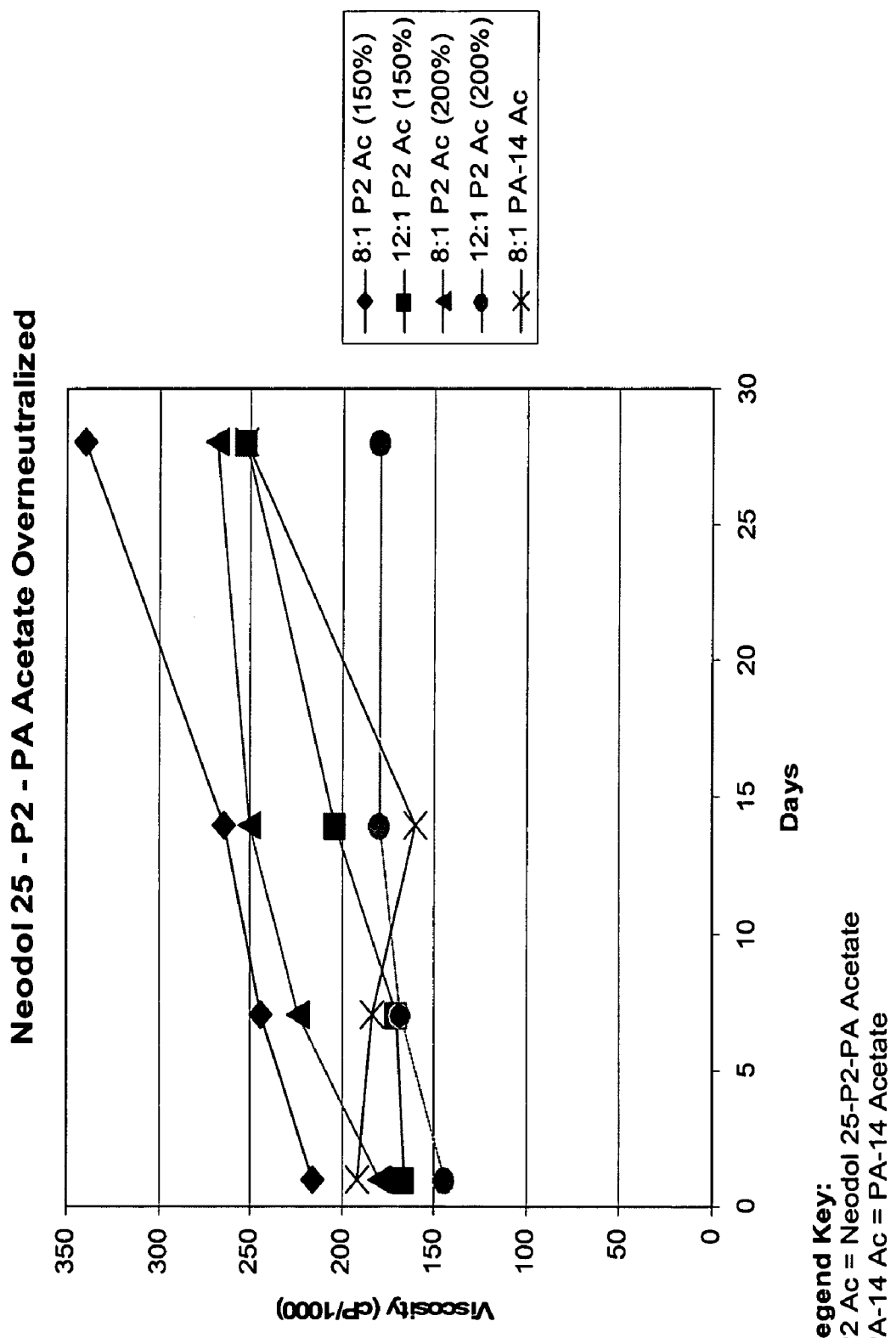
FIG. 4 is a graph showing the viscosities of exemplary asphalt-based roof coating compositions including a surfactant consisting of an overneutralized Neodol 25 alcohol-based 25-P2-PA Ac ether amine acetate salt at C/S ratios of 8:1, 12:1 and 16:1. Exemplary asphalt-based coating compositions including PA-14 Acetate salt surfactant at C/S ratios of 8:1 and 12:1 are included for comparison.

Table 6 provides the four week viscosity data and FIG. 4 presents the viscosity data in graphical form taken over the four weeks at the indicated time intervals.

TABLE 6

| C/S Ratio | Approx. Neutralization (%) | Four Week Viscosity (cP) |
|---|---|---|
| 8:1 | 150 | 340,000 |
| 12:1 | 150 | 252,000 |
| 8:1 | 200 | 268,000 |
| 12:1 | 200 | 180,000 |

Consistent with Example 2, the data show that the 8:1 C/S ratio exemplary compositions with 1.5 and 2 molar equivalents of acetic acid had viscosities which were better than the counterpart 8:1 C/S ratio composition of Example 1. The 12:1 C/S ratio composition with 1.5 molar equivalents of acetic acid had viscosities comparable to the 8:1 C/S ratio standard composition at between 2 to 4 weeks. The 12:1 C/S ratio composition with 2 molar equivalents of acetic acid had viscosities which were excellent. Each exemplary composition of Example 4 has superior viscosities while utilizing relatively increased amounts of the less expensive acetic acid constituent. Each example (and the standard) was homogenous had a stable gel structure.

Example 5

Example 5 includes three exemplary asphalt-based roof coating compositions according to Tables 1 and 2 together with a propoxylated alcohol-based ether amine salt surfactant represented by formula III. Huntsman Surfonamine ML-300 propoxylated ether amine and 1 molar equivalent of acetic acid were admixed to formulate the salt. Three 350 gram samples were prepared with clay to surfactant ratios of 8:1, 12:1 and 16:1 as indicated in Table 1.

Figure 5:
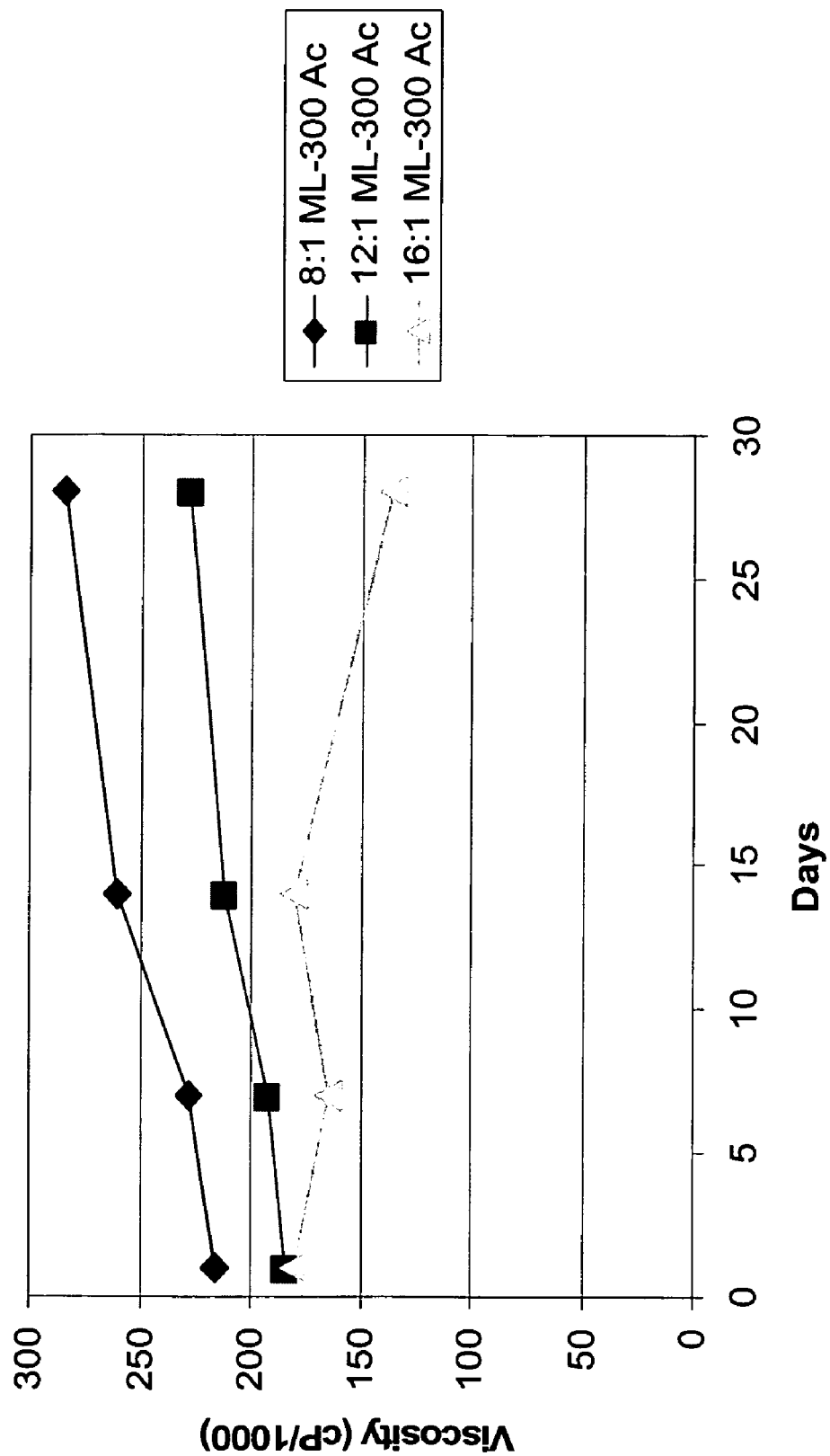
FIG. 5 is a graph showing the viscosities of exemplary asphalt-based roof coating compositions including a neutralized Surfonamine ML-300® acetate salt surfactant. Data are provided for compositions with C/S ratios of 8:1, 12:1 and 16:1.

Table 7 provides the viscosity of the samples at the indicated four week time period. FIG. 5 presents the four week data graphically taken at the noted intervals.

TABLE 7

| C/S Ratio | Approx. Neutralization (%) | Four Week Viscosity (cP) |
|---|---|---|
| 8:1 | 100 | 284,000 |
| 12:1 | 100 | 228,000 |
| 16:1 | 100 | 136,000 |

The data demonstrate that each of the 8:1, 12:1 and 16:1 C/S ratio sample compositions have excellent viscosities. The compositions were homogenous after four weeks and had stable gel structures. These compositions represent excellent asphalt-based roof coating compositions.

Example 6

Example 6 includes five exemplary roof coating compositions, each including the same surfactant but a different clay. Five asphalt-based roof coating compositions were prepared according to the base formulations of Tables 1 and 2. Each composition was prepared with an 8:1 C/S ratio. As indicated in Table 2, the asphalt cutback used was Henry Company Asphalt Cutback. The surfactant was Neodol 25 alcohol-based 25-P1-PA neutralized with 1 molar equivalent of acetic acid.

Each composition was prepared with a different commercially-available clay identified in Table 8. The compositions were prepared and the viscosities taken as described in connection with the base formulation. Table 8 provides the viscosity data at four weeks. FIG. 6 presents the viscosity data taken over four weeks at the noted intervals in graphical form.

TABLE 8

| Clay/Source | C/S Ratio | Approx. Neutralization (%) | Four Week Viscosity (cP) |
|---|---|---|---|
| Minugel G-35 Floridin Co. | 8:1 | 100 | 276,000 |
| Minugel 400 Floridin Co. | 8:1 | 100 | 186,000 |
| Florigel T Floridin Co. | 8:1 | 100 | 206,000 |
| Karnak A Karnak Corp. | 8:1 | 100 | 256,000 |
| Karnak B Karnak Corp. | 8:1 | 100 | 240,000 |

Four week viscosities for each of the five compositions exceeded the 60,000 to 130,000 cP range. Each composition is an acceptable roof coating composition. The data show that the surfactant is robust because the surfactant is efficacious with a range of different clay materials. The compositions of Example 6 were all homogenous after four weeks indicating gel stability.

Examples 7–60

Exemplary asphalt-based roof coating compositions were prepared at 8:1 and 12:1 C/S ratios using the low-shear blending method. Each example consisted of a 350 gram coating composition consisting of Henry Company asphalt cutback, Floridin Minugel G-35 Attapulgite clay and a surfactant made up according to the 8:1 or 12:1 C/S ratio weight percents/amounts of Table 1. Table 9 identifies the propoxylated alcohol-based ether amines used in each example and the amine structure according to formula I.

TABLE 9

| Ex. No. | Surfactant | $R_1$ | M | $R_2$ |
|---|---|---|---|---|
| 7–24 | Neodol 25 alcohol-based 25-P1-PA | $C_{12}$–$C_{15}$ | 1 | n-propyl |
| 25–30 | Neodol 11 alcohol-based 1-P1-PA | $C_{11}$ | 1 | n-propyl |
| 31–36 | Neodol 11 alcohol-based 1-P3-PA | $C_{11}$ | 3 | n-propyl |
| 37–42 | Neodol 45 alcohol-based 45-P1-PA | $C_{14}$–$C_{15}$ | 1 | n-propyl |
| 43–48 | Neodol 45 alcohol-based 45-P3-PA | $C_{14}$–$C_{15}$ | 3 | n-propyl |
| 49–54 | Exxal 10 alcohol-based 10-P1-PA | $C_{10}$ | 1 | n-propyl |
| 55–60 | Exxal 13 alcohol-based 13-P1-PA | $C_{13}$ | 1 | n-propyl |

Table 10 presents the specific propoxylated alcohol-based ether amine and acid used to formulate each surfactant, the C/S ratio, the molar ratio of acid used to neutralize the amine (as approximate % neutralization) and the viscosity after four weeks in centipoise units. Viscosity measurements were taken according to ASTM D2196-81 using a Brookfield RVT viscometer with a #7 spindle at 10 RPM.

TABLE 10

| Ex. | Viscosity cP After Four Weeks | Precursor Amine | Acid | C/S Ratio | Approx. Neutralization (%) |
|---|---|---|---|---|---|
| 7 | 90,000 to 149,999 | Neodol 25-P1-PA | Propionic | 8:1 | 100% |
| 8 | 90,000 to 149,999 | Neodol 25-P1-PA | Propionic | 12:1 | 100% |
| 9 | >150,000 | Neodol 25-P1-PA | Propionic | 8:1 | 150% |
| 10 | 90,000 to 149,999 | Neodol 25-P1-PA | Propionic | 12:1 | 150% |
| 11 | >150,000 | Neodol 25-P1-PA | Propionic | 8:1 | 200% |
| 12 | 65,000 to 89,999 | Neodol 25-P1-PA | Propionic | 12:1 | 200% |
| 13 | >150,000 | Neodol 25-P1-PA | Formic | 8:1 | 100% |
| 14 | 90,000 to 149,999 | Neodol 25-P1-PA | Formic | 12:1 | 100% |
| 15 | >150,000 | Neodol 25-P1-PA | Formic | 8:1 | 150% |
| 16 | 45,000 to 64,999 | Neodol 25-P1-PA | Formic | 12:1 | 150% |
| 17 | >150,000 | Neodol 25-P1-PA | Formic | 8:1 | 200% |
| 18 | 90,000 to 149,999 | Neodol 25-P1-PA | Formic | 12:1 | 200% |
| 19 | >150,000 | Neodol 25-P1-PA | Isobutyric | 8:1 | 100% |
| 20 | 65,000 to 89,999 | Neodol 25-P1-PA | Isobutyric | 12:1 | 100% |
| 21 | >150,000 | Neodol 25-P1-PA | Isobutyric | 8:1 | 150% |
| 22 | 65,000 to 89,999 | Neodol 25-P1-PA | Isobutyric | 12:1 | 150% |
| 23 | 90,000 to 149,999 | Neodol 25-P1-PA | Isobutyric | 8:1 | 200% |
| 24 | 65,000 to 89,999 | Neodol 25-P1-PA | Isobutyric | 12:1 | 200% |
| 25 | >150,000 | Neodol 1-P1-PA | Acetic | 8:1 | 100% |
| 26 | 65,000 to 89,999 | Neodol 1-P1-PA | Acetic | 12:1 | 100% |
| 27 | >150,000 | Neodol 1-P1-PA | Acetic | 8:1 | 150% |
| 28 | 65,000 to 89,999 | Neodol 1-P1-PA | Acetic | 12:1 | 150% |
| 29 | >150,000 | Neodol 1-P1-PA | Acetic | 8:1 | 200% |
| 30 | 65,000 to 89,999 | Neodol 1-P1-PA | Acetic | 12:1 | 200% |
| 31 | >150,000 | Neodol 1-P3-PA | Acetic | 8:1 | 100% |
| 32 | 45,000 to 64,999 | Neodol 1-P3-PA | Acetic | 12:1 | 100% |
| 33 | >150,000 | Neodol 1-P3-PA | Acetic | 8:1 | 150% |
| 34 | 65,000 to 89,999 | Neodol 1-P3-PA | Acetic | 12:1 | 150% |
| 35 | >150,000 | Neodol 1-P3-PA | Acetic | 8:1 | 200% |
| 36 | 45,000 to 64,999 | Neodol 1-P3-PA | Acetic | 12:1 | 200% |
| 37 | >150,000 | Neodol 45-P1-PA | Acetic | 8:1 | 100% |
| 38 | 45,000 to 64,999 | Neodol 45-P1-PA | Acetic | 12:1 | 100% |
| 39 | >150,000 | Neodol 45-P1-PA | Acetic | 8:1 | 150% |
| 40 | 90,000 to 149,999 | Neodol 45-P1-PA | Acetic | 12:1 | 150% |
| 41 | >150,000 | Neodol 45-P1-PA | Acetic | 8:1 | 200% |
| 42 | 45,000 to 64,999 | Neodol 45-P1-PA | Acetic | 12:1 | 200% |
| 43 | >150,000 | Neodol 45-P3-PA | Acetic | 8:1 | 100% |

TABLE 10-continued

| Ex. | Viscosity cP After Four Weeks | Precursor Amine | Acid | C/S Ratio | Approx. Neutralization (%) |
|---|---|---|---|---|---|
| 44 | 45,000 to 64,999 | Neodol 45-P3-PA | Acetic | 12:1 | 100% |
| 45 | >150,000 | Neodol 45-P3-PA | Acetic | 8:1 | 150% |
| 46 | 65,000 to 89,999 | Neodol 45-P3-PA | Acetic | 12:1 | 150% |
| 47 | >150,000 | Neodol 45-P3-PA | Acetic | 8:1 | 200% |
| 48 | 45,000 to 64,999 | Neodol 45-P3-PA | Acetic | 12:1 | 200% |
| 49 | >150,000 | Exxal 10-P1-PA | Acetic | 8:1 | 100% |
| 50 | 45,000 to 64,999 | Exxal 10-P1-PA | Acetic | 12:1 | 100% |
| 51 | >150,000 | Exxal 10-P1-PA | Acetic | 8:1 | 150% |
| 52 | 65,000 to 89,999 | Exxal 10-P1-PA | Acetic | 12:1 | 150% |
| 53 | >150,000 | Exxal 10-P1-PA | Acetic | 8:1 | 200% |
| 54 | 65,000 to 89,999 | Exxal 10-P1-PA | Acetic | 12:1 | 200% |
| 55 | >150,000 | Exxal 13-P1-PA | Acetic | 8:1 | 100% |
| 56 | 45,000 to 64,999 | Exxal 13-P1-PA | Acetic | 12:1 | 100% |
| 57 | >150,000 | Exxal 13-P1-PA | Acetic | 8:1 | 150% |
| 58 | 65,000 to 89,999 | Exxal 13-P1-PA | Acetic | 12:1 | 150% |
| 59 | >150,000 | Exxal 13-P1-PA | Acetic | 8:1 | 200% |
| 60 | 90,000 to 149,999 | Exxal 13-P1-PA | Acetic | 12:1 | 200% |

Table 10 shows that exemplary compositions are highly viscous and stable formulations across a wide range of surfactants encompassing a wide range of alcohols, acids, percent neutralizations, C/S ratios and degree of propoxylation (m values). The surfactants of Examples 7–60 were also all liquids thereby facilitating processing. All compositions were homogenous after four weeks and had stable gel structures.

Examples 61–99

Exemplary asphalt-based roof coating compositions were prepared based on a Neodol alcohol-based 25-P1-PA acetate salt surfactant (1 molar equivalent acetic acid, about 100% neutralized), asphalt cutback and clay. Each example consisted of a 350 gram coating composition made up according to the 8:1 or 12:1 C/S ratio weight percents/amounts of Table 1.

Table 11 presents the specific asphalt cutback, clay, C/S ratio and the viscosity (cP) after four weeks. The Trumbull asphalt cutbacks of Examples 92–95 are oxidized. All other asphalt cutbacks are unoxidized. Viscosity measurements were taken according to ASTM D2196-81 using a Brookfield RVT viscometer with a #7 spindle at 10 RPM.

TABLE 11

| Ex. | Viscosity cP After Four Weeks | Asphalt Cutback | Clay | C/S Ratio |
|---|---|---|---|---|
| 61 | 90,000 to 149,999 | Gardner-Gibson Seaford NJ | Florigel T | 8:1 |
| 62 | 90,000 to 149,999 | Gardner-Gibson Seaford NJ | Florigel T | 12:1 |
| 63 | 65,000 to 89,999 | Gardner-Gibson Seaford NJ | Minugel G-35 | 8:1 |
| 64 | 90,000 to 149,999 | Gardner-Gibson Seaford NJ | Minugel G-35 | 12:1 |
| 65 | 65,000 to 89,999 | Gardner-Gibson Seaford NJ | Attagel 17 | 8:1 |
| 66 | 90,000 to 149,999 | Gardner-Gibson Seaford NJ | Attagel 17 | 12:1 |
| 67 | 90,000 to 149,999 | Gardner-Gibson Longbeach CA | Florigel T | 8:1 |
| 68 | 90,000 to 149,999 | Gardner-Gibson Longbeach CA | Florigel T | 12:1 |
| 69 | 90,000 to 149,999 | Gardner-Gibson Longbeach CA | Minugel G-35 | 8:1 |
| 70 | 45,000 to 64,999 | Gardner-Gibson Longbeach CA | Minugel G-35 | 12:1 |
| 71 | >150,000 | Gardner-Gibson Longbeach CA | Attagel 17 | 8:1 |
| 72 | 90,000 to 149,999 | Gardner-Gibson Longbeach CA | Attagel 17 | 12:1 |
| 73 | 90,000 to 149,999 | Gardner-Gibson Tampa FL | Florigel T | 8:1 |
| 74 | 90,000 to 149,999 | Gardner-Gibson Tampa FL | Florigel T | 12:1 |
| 75 | >150,000 | Gardner-Gibson Tampa FL | Minugel G-35 | 8:1 |
| 76 | 65,000 to 89,999 | Gardner-Gibson Tampa FL | Minugel G-35 | 12:1 |
| 77 | >150,000 | Gardner-Gibson Tampa FL | Attagel 17 | 8:1 |
| 78 | 90,000 to 149,999 | Gardner-Gibson Tampa FL | Attagel 17 | 12:1 |
| 79 | 65,000 to 89,999 | Henry Company A | Florigel T | 8:1 |
| 80 | 65,000 to 89,999 | Henry Company A | Florigel T | 12:1 |
| 81 | 90,000 to 149,999 | Henry Company A | Minugel G-35 | 8:1 |
| 82 | >150,000 | Henry Company A | Attagel 17 | 8:1 |
| 83 | 65,000 to 89,999 | Henry Company A | Attagel 17 | 12:1 |
| 84 | 45,000 to 64,999 | Henry Company B | Florigel T | 8:1 |
| 85 | 65,000 to 89,999 | Henry Company B | Florigel T | 12:1 |
| 86 | 90,000 to 149,999 | Henry Company B | Minugel G-35 | 8:1 |
| 87 | >150,000 | Henry Company B | Attagel 17 | 8:1 |
| 88 | 65,000 to 89,999 | Henry Company B | Attagel 17 | 12:1 |
| 89 | 90,000 to 149,999 | Trumbull 6052 | Florigel T | 8:1 |
| 90 | 90,000 to 149,999 | Trumbull 6052 | Florigel T | 12:1 |
| 91 | >150,000 | Trumbull 6052 | Minugel G-35 | 8:1 |
| 92 | >150,000 | Trumbull 6089 | Minugel G-35 | 8:1 |
| 93 | 90,000 to 149,999 | Trumbull 6089 | Minugel G-35 | 12:1 |
| 94 | >150,000 | Trumbull 6089 | Attagel 17 | 8:1 |
| 95 | 90,000 to 149,999 | Trumbull 6089 | Attagel 17 | 12:1 |
| 96 | 90,000 to 149,999 | Asphalt Products | Florigel T | 8:1 |
| 97 | 90,000 to 149,999 | Asphalt Products | Florigel T | 12:1 |
| 98 | 65,000 to 89,999 | Asphalt Products | Minugel G-35 | 8:1 |
| 99 | >150,000 | Asphalt Products | Attagel 17 | 8:1 |

Table 11 demonstrates that roof coating compositions of the invention are highly viscous mixtures with stable gel structures after four weeks when formulated across a wide variety of asphalt cutbacks, attapulgite clays and C/S ratios. The data show that the surfactant is robust because they can be used with a range of other constituents to make efficacious coating compositions.

Example 100

Example 100 is directed to a hypothetical asphalt-based roof coating composition formulation which was not actually prepared. The hypothetical example is directed to a roof coating composition comprising asphalt cutback, clay and a propoxylated alcohol-based ether amine including four molar equivalents of propylene oxide per mole of alcohol. In the hypothetical example, $R_1$ is $C_{22}$, m is 4 and $R_2$ is n-propyl. Erucyl alcohol used to synthesize the propoxylated alcohol-based ether amine is available from Aldrich Chemical Co. of Milwaukee, Wis. Table 12 lists the proposed constituents.

TABLE 12

| Constituent | Type/Source | wt. % | Amount (g) |
|---|---|---|---|
| Asphalt Cutback | Trumbull Asphalt Cutback #6009 (oxidized) Trumbull Asphalt, Summit, Illinois | 87 wt. % | 87 g |
| Surfactant | Propoxylated erucyl alcohol-based ether amine acetate salt surfactant (100% neutralized) | 1 wt. % | 1 g |
| Clay | Attagel 36 Attapulgite Clay Gardner-Gibson, Longbeach CA | 12 wt. % | 12 g |

It is expected that an asphalt-based coating composition according to the formulation in Table 12 would have an efficacious viscosity, homogeneity and gel stability and would have utility as an asphalt-based roof coating composition.

Example 101

Example 101 examined the preparation of a primary ether amine acetate salt based on an un-propoxylated Neodol 25 alcohol (i.e., Neodol-based 25-P0-PA). This product was prepared according to the synthesis described with respect to the base formulation amine precursor except that propylene oxide was not added to the alcohol before amine synthesis. Therefore, the precursor amine was as according to formula I except that m was zero (0). The un-propoxylated ether amine was converted to a 100% neutralized salt as in formula I by addition of acetic acid.

The resulting salt surfactant was a solid at room temperature. This substantiates that the propylene oxide insertion to the linear alcohol in the examples is what induces liquidity. The presence of the propylene oxide groups, therefore, represents a significant advantage of the salt surfactants as described herein.

The roof coating composition of Example 101 was prepared with a C/S ratio of 8:1 utilizing the solid salt surfactant and the constituents listed in Table 13.

TABLE 13

| Constituent | Type/Source | wt. % | Amount (g) |
|---|---|---|---|
| Asphalt Cutback | Henry Company Asphalt | 85 wt. % | 85 g |

TABLE 13-continued

| Constituent | Type/Source | wt. % | Amount (g) |
|---|---|---|---|
| Surfactant | Un-propoxylated Neodol alcohol (Neodol-based 25-P0-PA) (100% neutralized) | 1.7 wt. % | 1.7 g |
| Clay | Minugel G-35 Floridin Co. | 13.3 wt. % | 13.3 g |

Because the salt surfactant was solid, the composition of Example 101 required significantly more rigorous mixing in order to disperse the clay, asphalt cutback and surfactant constituents. After four weeks, the roof coating composition had a viscosity of 154,000 cP (Compare with Table 3, Example 1 Neodol 25-P1-PA Ac viscosity: 276,000 cP and Table 5, Example 3 Neodol 25-P2-PA Ac viscosity 316,000 cP) The lower viscosity resulting from the lack of any propylene oxide addition to the alcohol is further evidence that the enhanced liquidity of surfactants as described herein produces more efficacious coating compositions which are easier to formulate.

While the principles of this invention have been particularly shown and described in connection with specific embodiments, it should be understood clearly that these descriptions are made only by way of example and are not intended to limit the scope of the invention.

The invention claimed is:

1. A composition comprising:
about 50 to about 98 weight percent asphalt cutback;
about 1.7 to about 47.4 weight percent clay; and
a salt surfactant having the general structural formula I:

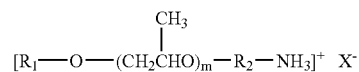

wherein, $R_1$ is a linear, branched or cyclic, saturated or unsaturated aliphatic or alkylaryl group having between about 8 to about 24 carbon atoms, m is an integer from 1 to about 4, $R_2$ is an n-propyl or iso-propyl group and X— is an anion, said salt surfactant being present in sufficient amount to impart a desired viscosity to the composition.

2. The composition of claim 1 comprising about 0.1 to about 7.1 weight percent of the salt surfactant.

3. The composition of claim 1 comprising:
about 80 to about 98 weight percent asphalt cutback;
about 1.7 to about 19.0 weight percent clay; and
about 0.1 to about 3.0 weight percent of the salt surfactant.

4. The composition of claim 3 comprising:
about 83 to about 88 weight percent asphalt cutback;
about 10.3 to about 16.1 weight percent clay; and
about 0.6 to about 2.4 weight percent of the salt surfactant.

5. The composition of claim 1 wherein $R_1$ comprises an aliphatic group having between about 10 to about 18 carbon atoms.

6. The composition of claim 5 wherein $R_1$ comprises an aliphatic group having between about 12 to about 15 carbon atoms.

7. The composition of claim 1 wherein m is about 1 to about 3.

8. The composition of claim 1 wherein $R_2$ is an n-propyl group.

9. The composition of claim 1 wherein $R_2$ is an iso-propyl group.

10. The composition of claim 1 wherein the salt surfactant comprises one or more of the surfactants of formulae II–III, or a combination thereof:

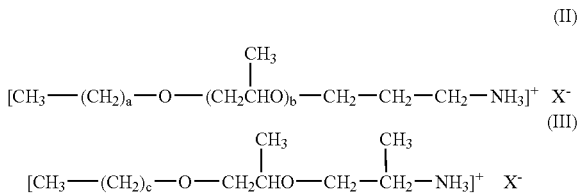

wherein, a is an integer from 11 to 14, b is an integer from 1 to about 4, c is an integer from 11 to about 13 and X— is defined as in formula I.

11. The composition of claim 1 wherein X— is the anion of an acid comprising one or more of organic acids, inorganic acids and mixtures thereof.

12. The composition of claim 11 wherein the acid comprises one or more of hydrochloric acid, phosphoric acid, polyphosphoric acid, sulfuric acid and mixtures thereof.

13. The composition of claim 11 wherein the acid comprises one or more of benzoic acid, isooctanoic acid, formic acid, acetic acid, hydroxyacetic acid, propionic acid, isobutyric acid, isophthalatic acid, phthalatic acid, butyric acid, dimer acids, oil-derived acids, neo acids and mixtures thereof.

14. The composition of claim 13 wherein the acid is acetic acid.

15. The composition of claim 13 wherein the acid is formic acid.

16. The composition of claim 11 wherein the acid is present in an amount of about 1 to about 2.50 times the amount required to neutralize the amine.

17. The composition of claim 1 wherein the clay comprises one or more of attapulgite clay, bentonite clay, ball clay, sepiolite clay, kaolin-type clays and mixtures thereof.

18. The composition of claim 17 wherein the clay is attapulgite clay.

19. The composition of claim 1 wherein the composition has a clay to surfactant ratio of at least about 6:1.

20. The composition of claim 1 further comprising one or more of sand, mica, ground slate, diatomaceous earth, ground limestone, wollastonite, pearlite, cellulosic fibers, talc, and polyolefin fibers and mixtures thereof.

21. A composition comprising:
a salt surfactant having the general structural formula I:

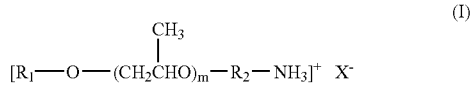

wherein, $R_1$ is a linear, branched or cyclic, saturated or unsaturated aliphatic or alkylaryl group having between about 8 to about 24 carbon atoms, m is an integer from 1 to about 4, $R_2$ is an n-propyl or iso-propyl group and X— is an anion.
clay in an amount sufficient to provide a clay to surfactant ratio of between about 6:1 to about 18:1; and
asphalt cutback.

22. The composition of claim 21 comprising:
about 50 to about 98 weight percent asphalt cutback;
about 1.7 to about 47.4 weight percent clay; and
about 0.1 to about 7.1 weight percent of the salt surfactant.

23. The composition of claim 22 comprising:
about 80 to about 98 weight percent asphalt cutback;
about 1.7 to about 19.0 weight percent clay; and
about 0.1 to about 3.0 weight percent of the salt surfactant.

24. The composition of claim 23 comprising:
about 83 to about 88 weight percent asphalt cutback;
about 10.3 to about 16.1 weight percent clay; and
about 0.6 to about 2.4 weight percent of the salt surfactant.

25. The composition of claim 21 wherein $R_1$ comprises an aliphatic group having between about 10 to about 18 carbon atoms.

26. The composition of claim 25 wherein $R_1$ comprises an aliphatic group having between about 12 to about 15 carbon atoms.

27. The composition of claim 21 wherein m is about 1 to about 3.

28. The composition of claim 21 wherein $R_2$ is an n-propyl group.

29. The composition of claim 21 wherein $R_2$ is an iso-propyl group.

30. The composition of claim 21 wherein the salt surfactant comprises one or more of the surfactants of formulae II–III, or a combination thereof:

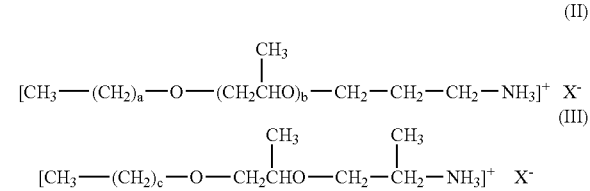

wherein, a is an integer from 11 to 14, b is an integer from 1 to about 4, c is an integer from 11 to about 13 and X— is defined as in formula I.

31. The composition of claim 21 wherein X— is the anion of an acid comprising one or more of organic acids, inorganic acids and mixtures thereof.

32. The composition of claim 31 wherein the acid comprises one or more of hydrochloric acid, phosphoric acid, polyphosphoric acid, sulfuric acid and mixtures thereof.

33. The composition of claim 31 wherein the acid comprises one or more of benzoic acid, isooctanoic acid, formic acid, acetic acid, hydroxyacetic acid, propionic acid, isobutyric acid, isophthalatic acid, phthalatic acid, butyric acid, dimer acids, oil-derived acids, neo acids and mixtures thereof.

34. The composition of claim 33 wherein the acid is acetic acid.

35. The composition of claim 33 wherein the acid is formic acid.

36. The composition of claim 31 wherein the acid is present in an amount of about 1 to about 2.50 times the amount required to neutralize the amine.

37. The composition of claim 21 wherein the clay comprises one or more of attapulgite clay, bentonite clay, ball clay, sepiolite clay, kaolin-type clays and mixtures thereof.

38. The composition of claim 37 wherein the clay is attapulgite clay.

39. A salt surfactant having the general structural formula:

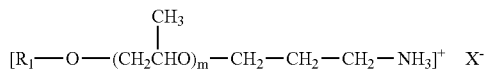

wherein, $R_1$ is a linear, branched or cyclic, saturated or unsaturated aliphatic or alkylaryl group having between about 8 to about 24 carbon atoms, m is an integer from 1 to about 4 and X— is an anion.

40. The salt surfactant of claim 39 wherein $R_1$ comprises an aliphatic group having between about 10 to about 18 carbon atoms.

41. The salt surfactant of claim 40 wherein $R_1$ comprises an aliphatic group having between about 12 to about 15 carbon atoms.

42. The salt surfactant of claim 39 wherein m is about 1 to about 3.

43. The salt surfactant of claim 39 wherein X— is the anion of an acid comprising one or more of organic acids, inorganic acids and mixtures thereof.

44. The salt surfactant of claim 43 wherein the acid comprises one or more of hydrochloric acid, phosphoric acid, polyphosphoric acid, sulfuric acid and mixtures thereof.

45. The salt surfactant of claim 43 wherein the acid comprises one or more of benzoic acid, isooctanoic acid, formic acid, acetic acid, hydroxyacetic acid, propionic acid, isobutyric acid, isophthalatic acid, phthalatic acid, butyric acid, dimer acids, oil-derived acids, neo acids and mixtures thereof.

46. The salt surfactant of claim 45 wherein the acid is acetic acid.

47. The salt surfactant of claim 45 wherein the acid is formic acid.

48. The salt surfactant of claim 43 wherein the acid is present in an amount of about 1 to about 2.50 times the amount required to neutralize the amine.

* * * * *

UNITED STATES PATENT AND TRADEMARK OFFICE
CERTIFICATE OF CORRECTION

PATENT NO.         : 7,238,230 B1
APPLICATION NO. : 11/336023
DATED                  : July 3, 2007
INVENTOR(S)       : Moss et al.

It is certified that error appears in the above-identified patent and that said Letters Patent is hereby corrected as shown below:

In column 3, line 52, delete "X–" and insert --$X^-$--.

In column 3, line 55, delete "X–" and insert --$X^-$--.

In column 6, line 48, delete "X–" and insert --$X^-$--.

In column 6, line 53, delete "X–" and insert --$X^-$--.

In column 7, line 54, delete "X–" and insert --$X^-$--.

In column 7, line 67, delete "X–" and insert --$X^-$--.

In column 8, line 3, delete "X–" and insert --$X^-$--.

In column 8, line 15, delete "X–" and insert --$X^-$--.

In column 8, line 19, delete "X–" and insert --$X^-$--.

In column 11, line 38, delete "Term." and insert --Tenn--.

In column 13, line 11, delete the two occurrences of "ethemitrile" and replace each such occurrence with --ethernitrile--.

In column 16, line 6, delete "25-P11-PA" and insert --25-P1-PA--.

In column 17, line 64, delete "oveneutralized" and insert --overneutralized--.

In column 18, line 27, after the word "homogenous" insert --and--.

UNITED STATES PATENT AND TRADEMARK OFFICE
CERTIFICATE OF CORRECTION

PATENT NO. : 7,238,230 B1
APPLICATION NO. : 11/336023
DATED : July 3, 2007
INVENTOR(S) : Moss et al.

It is certified that error appears in the above-identified patent and that said Letters Patent is hereby corrected as shown below:

In column 24, claim 1, line 42, delete "X–" and insert --X⁻--.

In column 25, claim 10, line 18, delete "X–" and insert --X⁻--.

In column 25, claim 11, line 20, delete "X–" and insert --X⁻--.

In column 25, claim 21, line 64, delete "X–" and insert --X⁻--.

In column 25, claim 21, line 64, delete "," and insert --;--.

In column 26, claim 30, line 43, delete "X–" and insert --X⁻--.

In column 26, claim 31, line 45, delete "X–" and insert --X⁻--.

In column 27, claim 39, line 13, delete "X–" and insert --X⁻--.

In column 27, claim 43, line 22, delete "X–" and insert --X⁻--.

Signed and Sealed this

Sixth Day of May, 2008

JON W. DUDAS
*Director of the United States Patent and Trademark Office*